United States Patent
Unnikrishnan et al.

(10) Patent No.: US 10,622,172 B2
(45) Date of Patent: Apr. 14, 2020

(54) INPUT DEVICES WITH ADJUSTABLE CLICK FORCE

(71) Applicant: RAZER (ASIA-PACIFIC) PTE. LTD., Singapore (SG)

(72) Inventors: Sreenath Unnikrishnan, Singapore (SG); Kok Kiong Low, Singapore (SG); Shyh Lai Long, Singapore (SG)

(73) Assignee: Razer (Asia-Pacific) PTE. LTD., Singapore (SG)

(*) Notice: Subject to any disclaimer, the term of this patent is extended or adjusted under 35 U.S.C. 154(b) by 99 days.

(21) Appl. No.: 15/564,287

(22) PCT Filed: Jun. 15, 2015

(86) PCT No.: PCT/SG2015/050160
§ 371 (c)(1),
(2) Date: Oct. 4, 2017

(87) PCT Pub. No.: WO2016/163950
PCT Pub. Date: Oct. 13, 2016

(65) Prior Publication Data
US 2018/0136728 A1 May 17, 2018

(30) Foreign Application Priority Data
Jun. 15, 2015 (WO) ................ PCT/SG2015/050160

(51) Int. Cl.
*H01H 13/85* (2006.01)
*H01H 13/14* (2006.01)
(Continued)

(52) U.S. Cl.
CPC ............. *H01H 13/85* (2013.01); *G06F 3/016* (2013.01); *G06F 3/03543* (2013.01); *H01H 13/14* (2013.01); *H01H 35/2614* (2013.01)

(58) Field of Classification Search
CPC .... G06F 3/016; G06F 3/0202; G06F 3/03543; H01H 13/14; H01H 13/85; H01H 35/2614
See application file for complete search history.

(56) References Cited

U.S. PATENT DOCUMENTS

| 5,466,901 A | 11/1995 | Mochizuki |
| 5,879,088 A | 3/1999 | English |

(Continued)

FOREIGN PATENT DOCUMENTS

| JP | 04-329417 A | 11/1992 |
| WO | 03/025846 A1 | 3/2003 |

OTHER PUBLICATIONS

Partial supplementary European Search Report dated Nov. 12, 2018, 17 pages, for the corresponding European Patent Application No. 15888632.5.

(Continued)

*Primary Examiner* — Ryan A Lubit
(74) *Attorney, Agent, or Firm* — Polsinelli PC

(57) ABSTRACT

According to various embodiments, an input device may be provided. The input device may include: a housing having an upper portion and a lower portion; a key top provided at the upper portion; a lever member coupled to the lower portion via a joint; a plunger; and a switch including a depressible portion coupleable to the key top via the lever member and the plunger; wherein the plunger is coupleable to the lever member at a distance from the joint which is different from a distance from the joint at which the depressible portion is coupleable to the lever member.

16 Claims, 16 Drawing Sheets

(51) Int. Cl.
*H01H 35/26* (2006.01)
*G06F 3/01* (2006.01)
*G06F 3/0354* (2013.01)

(56) References Cited

U.S. PATENT DOCUMENTS

| | | | | |
|---|---|---|---|---|
| 8,294,671 | B1 * | 10/2012 | Hargreaves | G06F 3/0334 |
| | | | | 345/157 |
| 8,537,114 | B2 | 9/2013 | Ma | |
| 2007/0251810 | A1 | 11/2007 | Corcoran et al. | |
| 2010/0164868 | A1 * | 7/2010 | Wu | G06F 3/03543 |
| | | | | 345/163 |
| 2011/0069008 | A1 * | 3/2011 | Kao | G06F 3/03543 |
| | | | | 345/163 |
| 2011/0084905 | A1 * | 4/2011 | Chang | G06F 3/03543 |
| | | | | 345/163 |
| 2011/0279371 | A1 | 11/2011 | Ma | |
| 2011/0303043 | A1 * | 12/2011 | Tang | G05G 1/04 |
| | | | | 74/491 |

OTHER PUBLICATIONS

Extended European Search Report dated Nov. 26, 2019, 10 pages, for the corresponding European Patent Application No. 19189081.3.

* cited by examiner

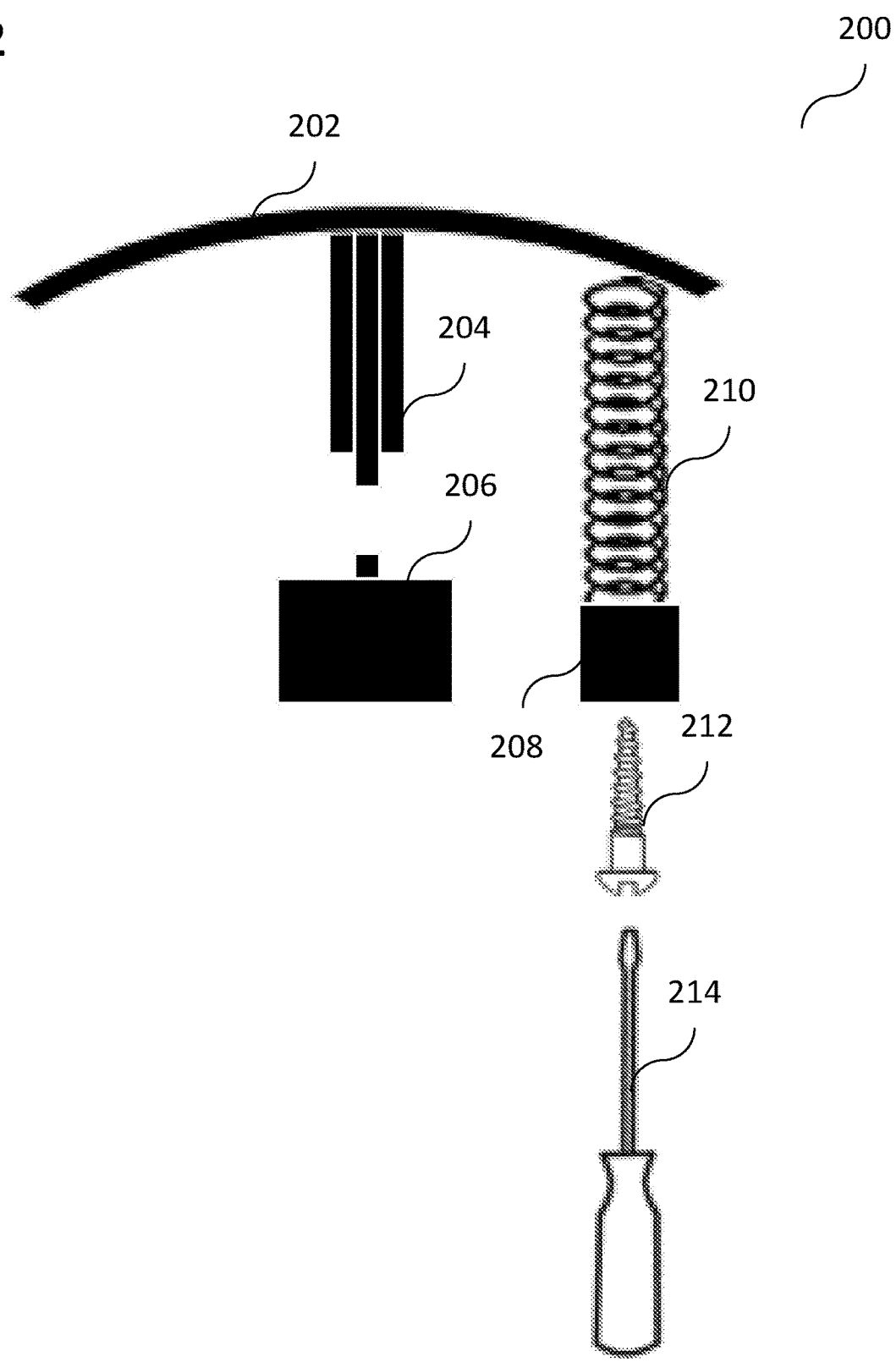

INPUT DEVICES WITH ADJUSTABLE CLICK FORCE

TECHNICAL FIELD

Various embodiments generally relate to input devices.

BACKGROUND

While micro-switches of various click forces exist, once a click force has been set for a micro-switch at the manufacturer level, it is not possible for the user to alter this force. As a result, users may be limited to the click force that a mouse comes with, by default. Thus, there may be a need for an improved click mechanism. Problems with existing mice that allow adjustable click forces are amongst others, reducing accidental clicks, enabling users to get higher click speeds as desired, adjust tactile feel and latency of the keys.

U.S. Pat. No. 8,537,114 discloses a mouse device which is operable with a variable button-pressing force. The mouse device includes a mouse base, a mouse case, a button disposed on the mouse case, a pressing plate contacted with the button, and the sliding member contacted with the pressing plate. The sliding member is partially protruded out of the mouse base, and movable with respect to the mouse base. When the sliding member is moved to a first position and contacted with a first touching part of the pressing plate, the force required for pressing the button is equal to a first downward external force. Whereas, when the sliding member is moved to a second position and contacted with a second touching part of the pressing plate, the force required for pressing the button is equal to a second downward external force.

US20110069008 discloses a mouse structure with click force adjustable function, which comprises a shell, a circuit board module, and at least one adjustable mechanism. The adjustable mechanism is setting inside the shell, and comprises a supporting body, an adjustable plate and an adjustable component. The adjustable mechanism is adjusted via the adjustable component, so that the place the free-end of the adjustable plate touching the key portion is changed, and the force the adjustable plate clicking the switch module is accordingly changed, which provides function that the user can adjust the click force finely to a suitable one.

SUMMARY OF THE INVENTION

According to various embodiments, an input device may be provided. The input device may include: a housing having an upper portion and a lower portion; a key top provided at the upper portion; a lever member coupled to the lower portion via a joint; a plunger; and a switch including a depressible portion coupleable to the key top via the lever member and the plunger; wherein the plunger is coupleable to the lever member at a distance from the joint which is different from a distance from the joint at which the depressible portion is coupleable to the lever member

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 1A, FIG. 1B, FIG. 1C, FIG. 2, FIG. 3, FIG. 4, FIG. 5, and FIG. 6 show various input devices according to various embodiments;

DETAILED DESCRIPTION

Figure 1A:
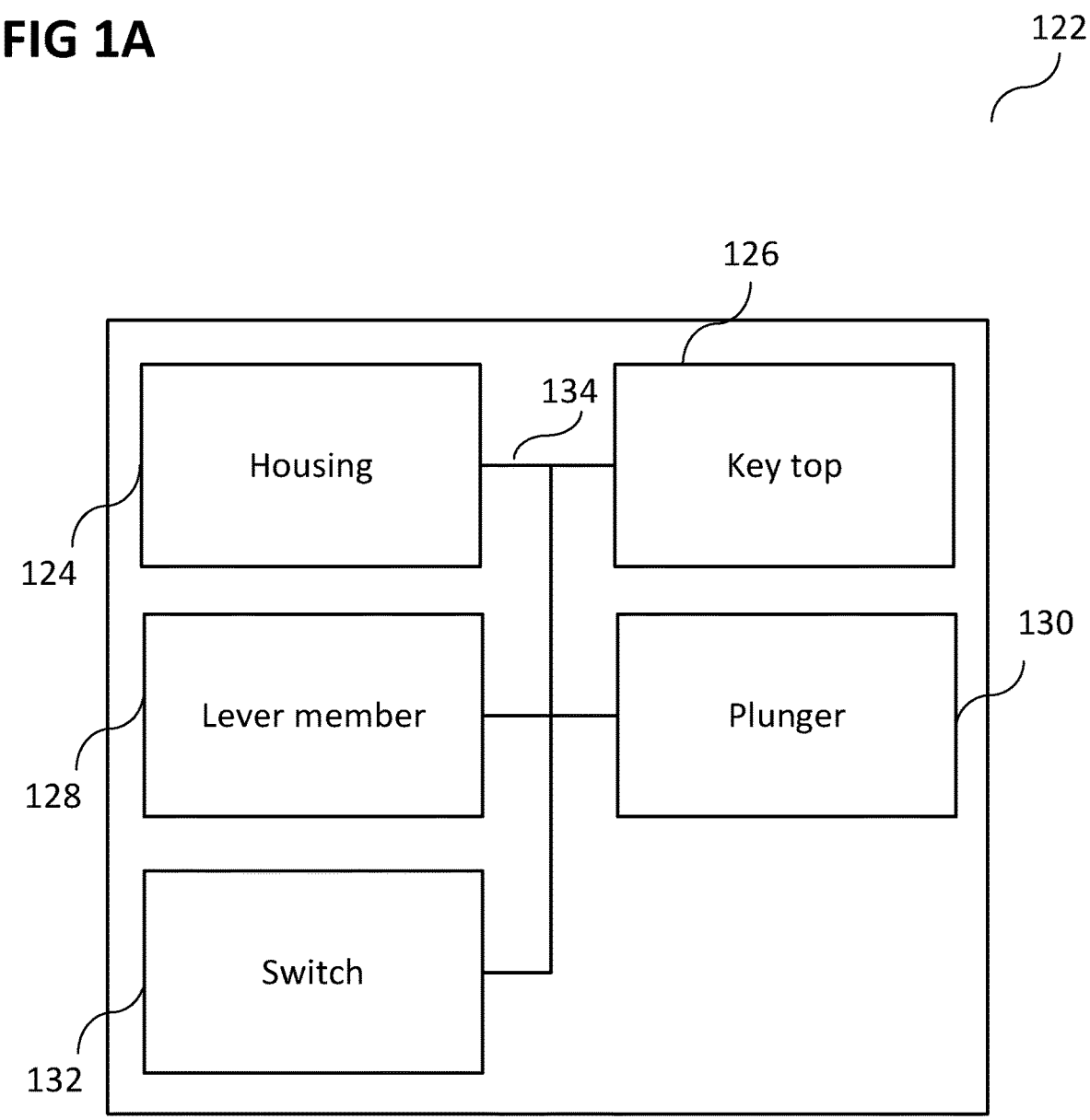

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the input device as described in this description may include a memory which is for example used in the processing carried out in the input device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

According to various embodiments, a key force adjustment for a mouse may be provided. According to various embodiments, a mechanism for adjusting the click force and tactile feel for a mouse may be provided.

While micro-switches of various click forces exist, once a click force has been set for a micro-switch at the manufacturer level, it is not possible for the user to alter this force. As a result, users may be limited to the click force that the mouse comes with, by default. According to various embodiments, an improved click mechanism may be provided.

According to various embodiments, a mechanism in a mouse may be provided which may enable to add another level of customizability for mice. Users who accidentally click their mouse button may want to increase their click force, while those who want faster response in-game may choose to decrease click force needed. Users may also be able to experiment with different click forces to find their most preferred tactile feed or increase click speed which is desirable for certain games such as MOBA (Multiplayer Online Battle Arena) and RTS (real-time strategy) games.

FIG. 1A shows an input device 122 according to various embodiments. The input device 122 may include a housing 124 having (in other words: including) an upper portion and a lower portion. The input device 122 may further include a key top 126 provided at the upper portion. The input device 122 may further include a lever member 128 (in other words: lever element) coupled to the lower portion via a joint. The joint may be included in the input device 122. The input device 122 may further include a plunger 130. The input device 122 may further include a switch 132 including a depressible portion coupleable to the key top 126 via the lever member 128 and the plunger 130. The plunger 130 may be coupleable to the lever member 128 at a distance from the joint which is different from a distance from the joint at which the depressible portion is coupleable to the lever member 128. The housing 124, the key top 126, the lever member 128, the plunger 130, and the switch 132 may be coupled with each other, like indicated by lines 134, for example electrically coupled, for example using a line or a cable, and/or mechanically coupled.

In other words, according to various embodiments, an input device may be provided in which a key top may engage via a plunger with a lever member to depress a switch, wherein a depressible portion of the switch is engageable with the lever member at a distance different from a distance at which the plunger is engageable with the lever member.

According to various embodiments, the plunger 130 may be coupleable to the lever member 128 at a distance from the joint which is larger than a distance from the joint at which the depressible portion is coupleable to the lever member 128.

According to various embodiments, the plunger 130 may be coupleable to the lever member 128 at a distance from the joint which is smaller than a distance from the joint at which the depressible portion is coupleable to the lever member 128.

According to various embodiments, the input device 122 may further include a biasing element (not shown in FIG. 1A) including a first end and a second end, wherein the first end is coupled to the key top 126, and wherein the second end is coupled to the lower portion. According to various embodiments, the input device 122 may further include an adjustment mechanism (not shown in FIG. 1A) configured to adjust a pretension of the biasing element.

According to various embodiments, the biasing element may include a spring.

According to various embodiments, the spring may include or may be at least one of a linear spring, a torsion spring, a leaf spring, or a spring plate.

According to various embodiments, the key top 126 may the plunger 130.

According to various embodiments, the plunger 130 may be configured to depress the switch 132.

According to various embodiments, the switch 132 may include or may be a mechanical switch.

According to various embodiments, the mechanical switch may include or may be a micro switch.

According to various embodiments, the switch may include a rubber dome.

According to various embodiments, the second end may be directly coupled to the lower portion.

According to various embodiments, the second end may be surrounded by a threaded insert.

According to various embodiments, the second end may be coupled to the lower portion via the lever member 128.

According to various embodiments, the lever member 128 may be coupled to the key top 126 so that when the key top 126 is depressed, the biasing element is depressed.

According to various embodiments, the lever member 128 may include the joint.

According to various embodiments, the second end may be coupled to the lower portion via the switch 132.

According to various embodiments, the adjustment mechanism may be accessible via the lower portion.

According to various embodiments, the adjustment mechanism may include or may be a screw.

According to various embodiments, the second end may be surrounded by a threaded insert configured to engage with the screw.

According to various embodiments, the lower portion may include a hole configured to expose the screw.

According to various embodiments, the adjustment mechanism may include or may be a dial.

According to various embodiments, the adjustment mechanism may include or may be a sliding element.

According to various embodiments, the sliding element may be configured to be slided in a direction at least substantially perpendicular to a direction between the first end and the second end.

According to various embodiments, the input device 122 may include or may be or may be included in at least one of a computer mouse, a joystick, a gamepad, or a keyboard.

According to various embodiments, the upper portion may include a further key top coupled to a further switch and to a further biasing element. According to various embodiments, the adjustment mechanism may further be configured to adjust a pretension of the further biasing element.

Figure 1B:
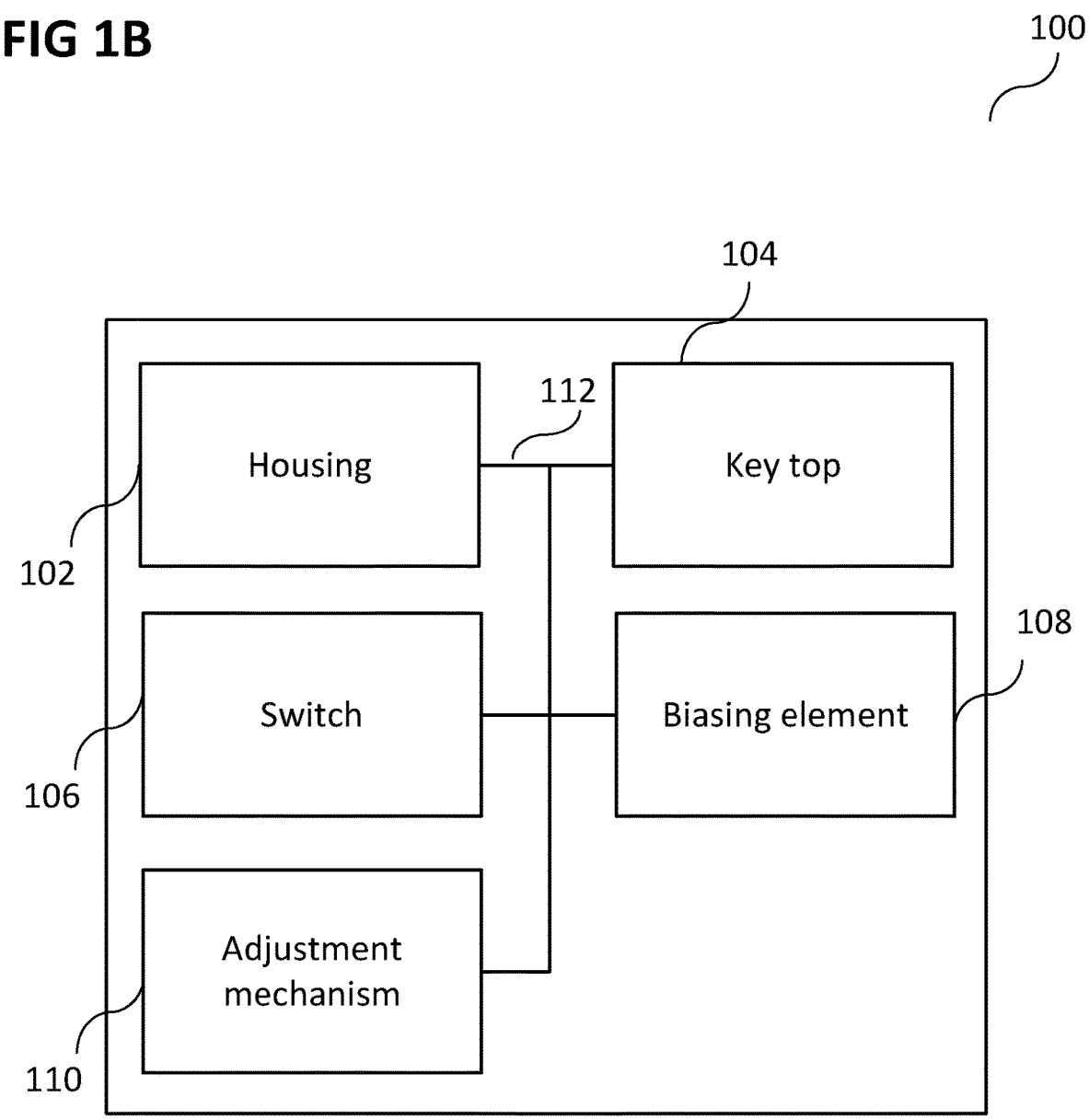

FIG. 1B shows an input device 100 according to various embodiments. The input device 100 may include a housing 102. The housing 102 may include an upper portion and a lower portion. The input device 100 may further include a key top 104 provided at (for example on) the upper portion of the housing 102. The input device 100 may further include a switch 106 coupled to the key top 104. The input device 100 may further include a biasing element 108 (in other words: biasing member; for example a spring or any other kind of biasing mechanism) having a first end and a second end. The first end may be coupled to the key top 104. The second end may be coupled to the lower portion of the housing 102. The input device 100 may further include an adjustment mechanism 110 configured to adjust a pretension of the biasing element 108. The housing 102, the key top 104, the switch 106, the biasing element 108, and the adjustment mechanism 110 may be coupled with each other, like indicated by lines 112, for example electrically coupled, for example using a line or a cable, and/or mechanically coupled.

In other words, an adjustment mechanism may be provided in an input device, and the adjustment mechanism may be configured to adjust a pretension of a biasing element connected to a key top.

According to various embodiments, the biasing element 108 may include or may be a spring.

According to various embodiments, the spring may include or may be a linear spring, and/or a torsion spring, and/or a leaf spring, and/or a spring plate.

According to various embodiments, the key top 104 may include a plunger (for example plunger 118 like illustrated in FIG. 1C and described in more detail below).

According to various embodiments, the plunger may be configured to depress the switch 106.

According to various embodiments, the switch 106 may include or may be a mechanical switch.

According to various embodiments, the mechanical switch may include or may be a micro switch.

According to various embodiments, the switch 106 may include a rubber dome.

According to various embodiments, the second end may directly be coupled to the lower portion.

According to various embodiments, the second end may be surrounded by a threaded insert.

According to various embodiments, the second end may be coupled to the lower portion via a lever member (for example lever member 116 like illustrated in FIG. 1C and described in more detail below).

According to various embodiments, the lever member may be coupled to the key top 104 so that when the key top 104 is depressed, the biasing element 108 is depressed.

According to various embodiments, the lever member may include a joint.

According to various embodiments, the second end may be coupled to the lower portion via the switch 106.

According to various embodiments, the adjustment mechanism 110 may be accessible via the lower portion.

According to various embodiments, the adjustment mechanism 110 may include or may be a screw.

According to various embodiments, the second end may be surrounded by a threaded insert configured to engage with the screw.

According to various embodiments, the lower portion may include a hole configured to expose the screw.

According to various embodiments, the adjustment mechanism 110 may include or may be a dial.

According to various embodiments, the adjustment mechanism 110 may include or may be a sliding element.

According to various embodiments, the sliding element may be configured to be slided in a direction at least substantially perpendicular to a direction between the first end and the second end.

According to various embodiments, the input device 100 may include or may be or may be included in a computer mouse, and/or a joystick, and/or a gamepad, and/or a keyboard.

According to various embodiments, the upper portion comprises a further key top coupled to a further switch and to a further biasing element. The adjustment mechanism 110 may further be configured to adjust a pretension of the further biasing element. In other words, the adjustment mechanism may simultaneously adjust pretensions of a plurality of biasing element for a plurality of key tops.

Figure 1C:
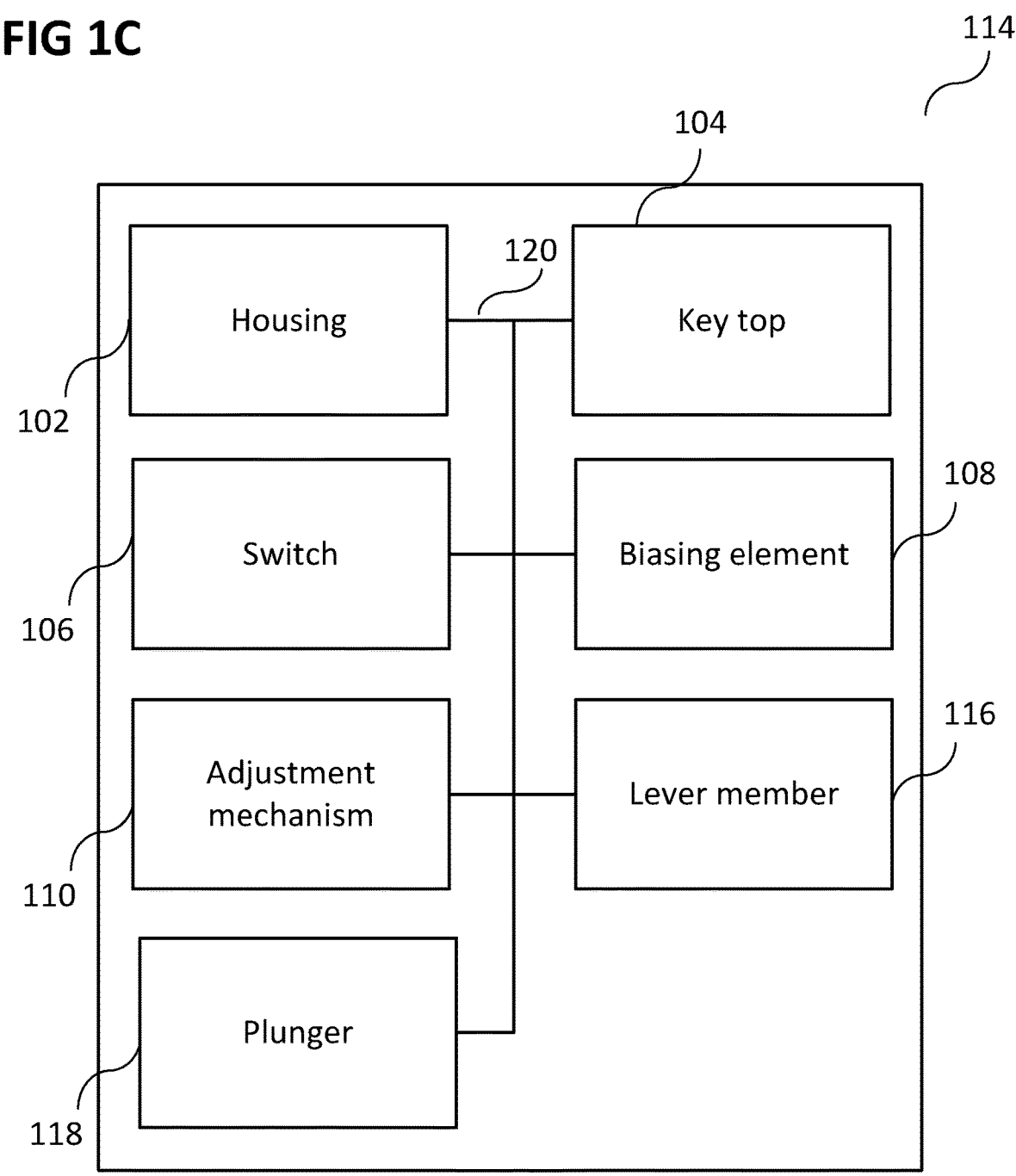

FIG. 1C shows an input device 114 according to various embodiments. The input device 114 may, similar to the input device 100 of FIG. 1B, include a housing 102. The housing 102 may include an upper portion and a lower portion. The input device 114 may, similar to the input device 100 of FIG. 1B, further include a key top 104 provided at (for example on) the upper portion of the housing 102. The input device 114 may, similar to the input device 100 of FIG. 1B, further include a switch 106 coupled to the key top 104. The input device 114 may, similar to the input device 100 of FIG. 1B, further include a biasing element 108 (in other words: biasing member; for example a spring or any other kind of biasing mechanism) having a first end and a second end. The first end may be coupled to the key top 104. The second end may be coupled to the lower portion of the housing 102. The input device 114 may, similar to the input device 100 of FIG. 1B, further include an adjustment mechanism 110 configured to adjust a pretension of the biasing element 108. The input device 114 may further include a lever member 116, like will be described in more detail below. The input device 114 may further include a plunger 118, like will be described in more detail below. The housing 102, the key top 104, the switch 106, the biasing element 108, the adjustment mechanism 110, the lever member 116, and the plunger 118 may be coupled with each other, like indicated by lines 120, for example electrically coupled, for example using a line or a cable, and/or mechanically coupled.

According to various embodiments, the switch 106 may include a depressible portion. The depressible portion may be the portion of the switch 106 which may be actuated due to a user pressing the key top 104, so that the switch 106 may close or may provide any other kind of electrical signal.

According to various embodiments, the depressible portion may be coupleable (in other words: engageable) to the key top 104 via the lever member 116 and the plunger 118. In other words, when a user presses the key top 104, the plunger 118 may provide a force to the lever member 116, and the lever member 116 may in turn provide a force to the depressible portion which may lead to the depressible portion being pressed. In other words, the switch 106 (and in more detail: the depressible portion of the switch 106) may be actuated via the plunger 118 and the lever member 116 when the user presses the key top 104.

According to various embodiments, the lever member 116 may be coupled to the lower portion of the housing 102 via a joint.

According to various embodiments, the plunger 118 may be coupleable to the lever member 116 at a distance from the joint which is at least substantially equal to a distance from the joint at which the depressible portion is coupleable to the lever member 116. As such, a force provided to the key top 104 may (via the plunger 118 and the lever member 116) be provided in (at least substantially) an unchanged amount to the depressible portion. In other words: a force required to depress the plunger 118 may be (at least substantially) equal to a switch force of the depressible portion of the switch 106.

According to various embodiments, the plunger 118 may be coupleable to the lever member 116 at a distance from the joint which is larger than a distance from the joint at which the depressible portion is coupleable to the lever member 116. As such, a force provided to the key top 104 may (via the plunger 118 and the lever member 116) be provided in an increased amount to the depressible portion. In other words: a force required to depress the plunger 118 may be lower than a switch force of the depressible portion of the switch 106.

According to various embodiments, the plunger 118 may be coupleable to the lever member 116 at a distance from the joint which is smaller than a distance from the joint at which the depressible portion is coupleable to the lever member 116. As such, a force provided to the key top 104 may (via the plunger 118 and the lever member 116) be provided in a decreased amount to the depressible portion. In other words: a force required to depress the plunger 118 may be larger than a switch force of the depressible portion of the switch 106.

According to various embodiments, an input device (for example a mouse) may have an adjustable mechanism located between the switch actuator (of the mouse) and the base of the mouse, the adjustable mechanism having a biasing means (for example a spring mechanism), one end of which is connected to the outer shell of the mouse, the other end of which is connected to a user adjustable element (in other words: an adjustment mechanism), the user adjustable element adjustable by a user from the base of the input device, wherein the adjustable element allows for compression and expansion of the adjustable mechanism to customize the click force and tactile feel of the switch actuator.

The mechanism according to various embodiments may give users the ability to change the click force of a mouse as per their preferences, reducing accidental clicks or enabling users to get higher click speeds as per desired.

Various embodiments may enable the user to customize click force and also adjust the tactile feel and/or the switch rebound characteristics of the switch.

According to various embodiments, an adjustable click force mouse may be provided. The mouse may allow a user to customize the click force of the button for different gaming requirements.

According to various embodiments, a mechanism for adjusting a click force and a tactile feel of an input device, for example a mouse, may be provided. The mechanism may provide users the ability to change the click force of a mouse as per their preferences, reducing accidental clicks or enabling users to get higher click speeds as per desired. Adding this mechanism in a mouse creates an additional level of customizability for mice. Users who accidentally click their mouse button would want to increase their click force, while those who want faster response ingame may choose to decrease click force needed. Users may also be able to experiment with different click forces to find their most preferred tactile feed or increase click speed which is desirable for certain games such as MOBA and RTS games. Furthermore, the mechanism may enable the user to adjust the tactile feel or the switch rebound characteristics of a switch inside the mouse.

According to various embodiments, an adjustable mechanism located between the switch actuator (of the mouse) and the base of the mouse may be provided. The adjustable mechanism may have a biasing means (for example a spring), one end of which may be connected to the outer shell of the mouse, and the other end of which may be connected to a user adjustable element. The user adjustable element may be adjustable by a user from the base (in other words: via a lower portion of the housing; in other words: via a bottom surface of a housing) of the mouse, wherein the adjustable element (for example a screw) allows for compression and expansion of the adjustable mechanism to customize the click force and tactile feel of the switch actuator. According to various embodiments, the user adjustable element can be a dial that facilitates rotation of the adjustable element in both a clockwise and anti-clockwise direction. According to various embodiments, when the user adjustable element is rotated in a direction (for example clockwise direction) the click force would be increased (or decreased) and when the adjustable element is rotated in an opposite direction (for example anti-clockwise) the click force would be decreased (or increased). According to various embodiments, using a spring may lead to a more satisfying tactile feel for the user. According to various embodiments, the adjustable element may be rotated with a finger or a coin or any other suitable device that can rotate the adjustable element. The compression force of the spring may be tweaked with a small screwdriver from beneath the mouse. This adjustable spring may be especially effective with gaming mice. According to various embodiments, guide lines or markers are provided on the adjustable element or housing that indicates variability of click forces.

FIG. 2 shows an input device 200 according to various embodiments. An outer shell (for example an upper portion 202 of the housing, in other words: a top surface of a housing of the input device) of the input device may be connected (or may include) a plunger 204 (which may also be referred to as a key cover actuator). The upper portion 202 of the housing may include a key top, which may be connected to the plunger 204. The plunger 204 may be configured to depress a switch 206 (for example a micro-switch), once the upper portion 202 (and thus the plunger 204) is pressed by a user. A biasing element 210, for example a spring (in other words: spring mechanism) may be connected to outer shell (for example to a lower portion 208 of a housing of the input device, in other words: a bottom surface of the housing of the input device). A screw 212 (for example a lead screw with detents) may be provided to compress or expand (in other words: to change a pre-tension) the biasing element 210 (for example spring) to a desired resistance. A screw driver 214 may be used to drive the screw 212, for example via a hole in the lower portion 208 of the housing of the input device.

According to various embodiments, adjusting the biasing element 210 (for example spring; for example by driving (in other words: turning) the screw 214) may lead to a satisfying tactile feel for the user.

Figure 3:
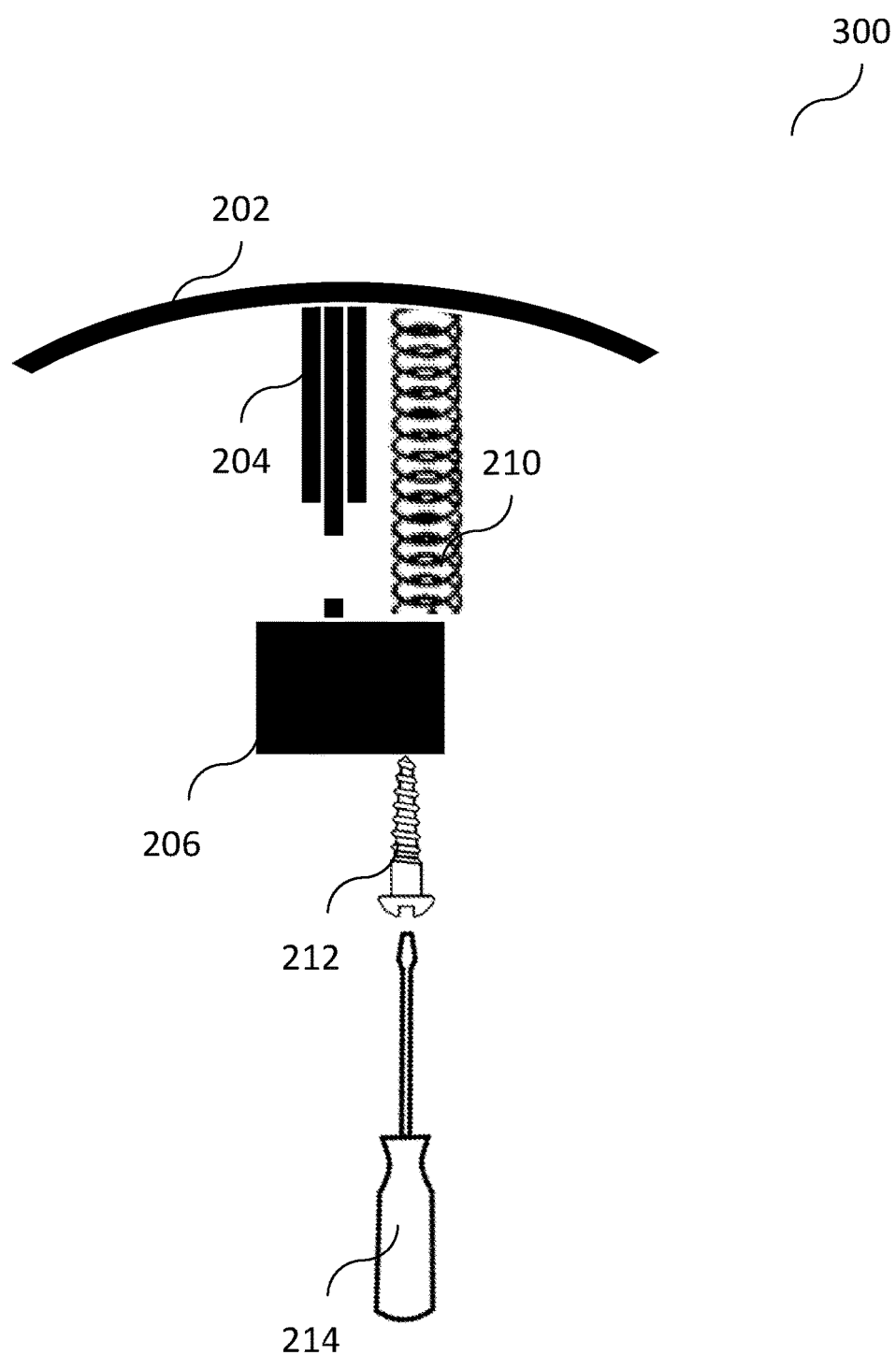

FIG. 3 shows an input device 300 according to various embodiments. Various portions of the input device 300 may be identical or similar to portions of the input device 200 of FIG. 2, so that the same reference signs may be used, and that duplicate description may be omitted. In the input device 300 shown in FIG. 3, the biasing element 210 (for example the spring) may be connected to the switch 206 (for example the micro switch), with the screw 212 (in other words: the screw mechanism) pushing the switch 206 up to change the tension.

Figure 4:
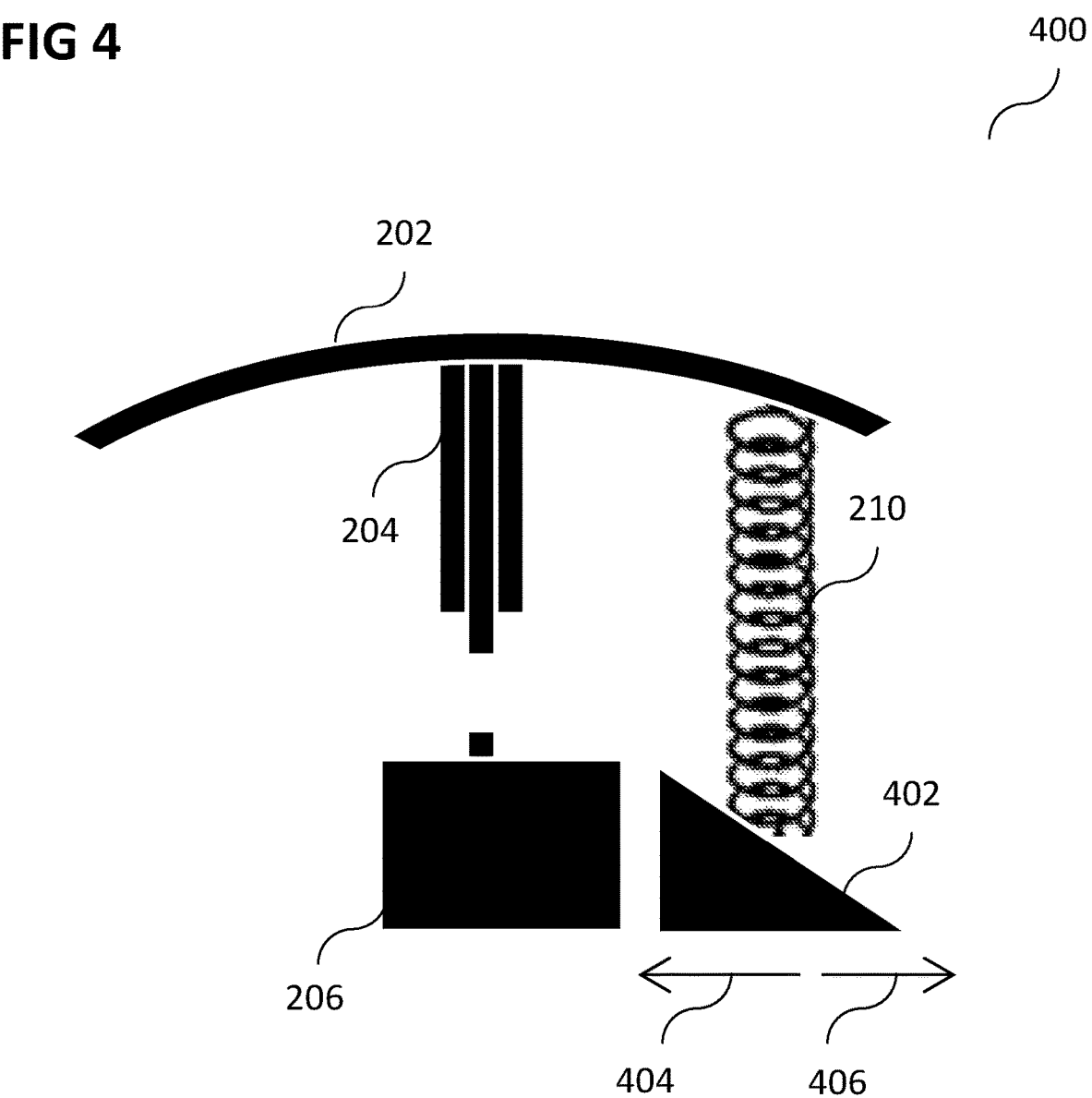

FIG. 4 shows an input device 400 according to various embodiments. Various portions of the input device 400 may be identical or similar to portions of the input device 200 of FIG. 2, so that the same reference signs may be used, and that duplicate description may be omitted. In the input device 400 shown in FIG. 4, a sliding mechanism 402 may be provided to compress the biasing element 210 (for example the spring) instead of (in other words: rather than) a screw mechanism. For example, when the sliding mechanism is moved in the direction of a left arrow 404, the biasing element 210 may be compressed and thus the pre-tension of the biasing element may be increased. For example, when the sliding mechanism is moved in the direction of a right arrow 406, the biasing element 210 may be extended and thus the pre-tension of the biasing element may be reduced.

Figure 5:
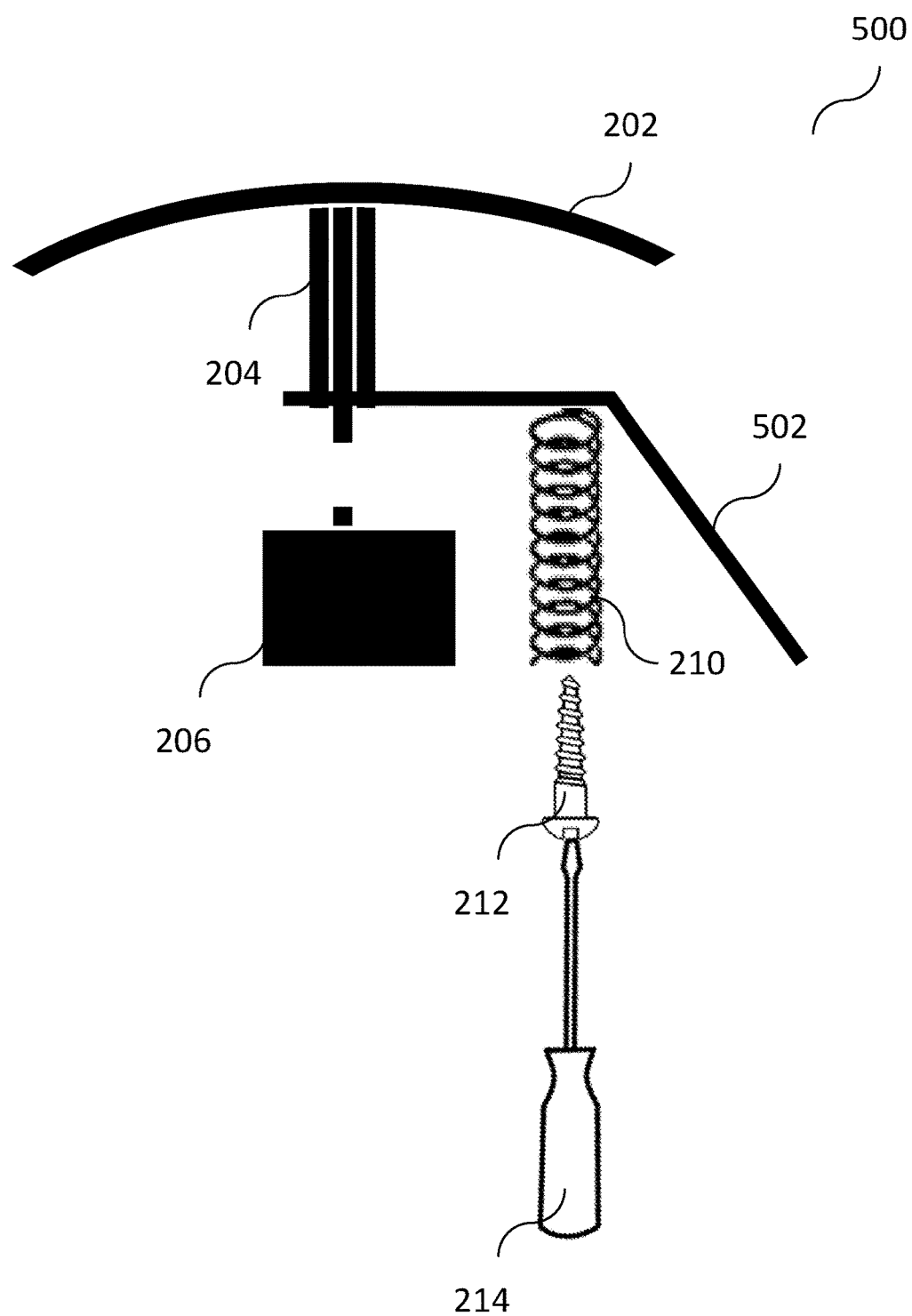

FIG. 5 shows an input device 500 according to various embodiments. Various portions of the input device 500 may be identical or similar to portions of the input device 200 of FIG. 2, so that the same reference signs may be used, and that duplicate description may be omitted. In the input device 500 shown in FIG. 5, the biasing element 210 (for example spring mechanism) may be connected to the plunger 204 via a cantilever 502.

Figure 6:
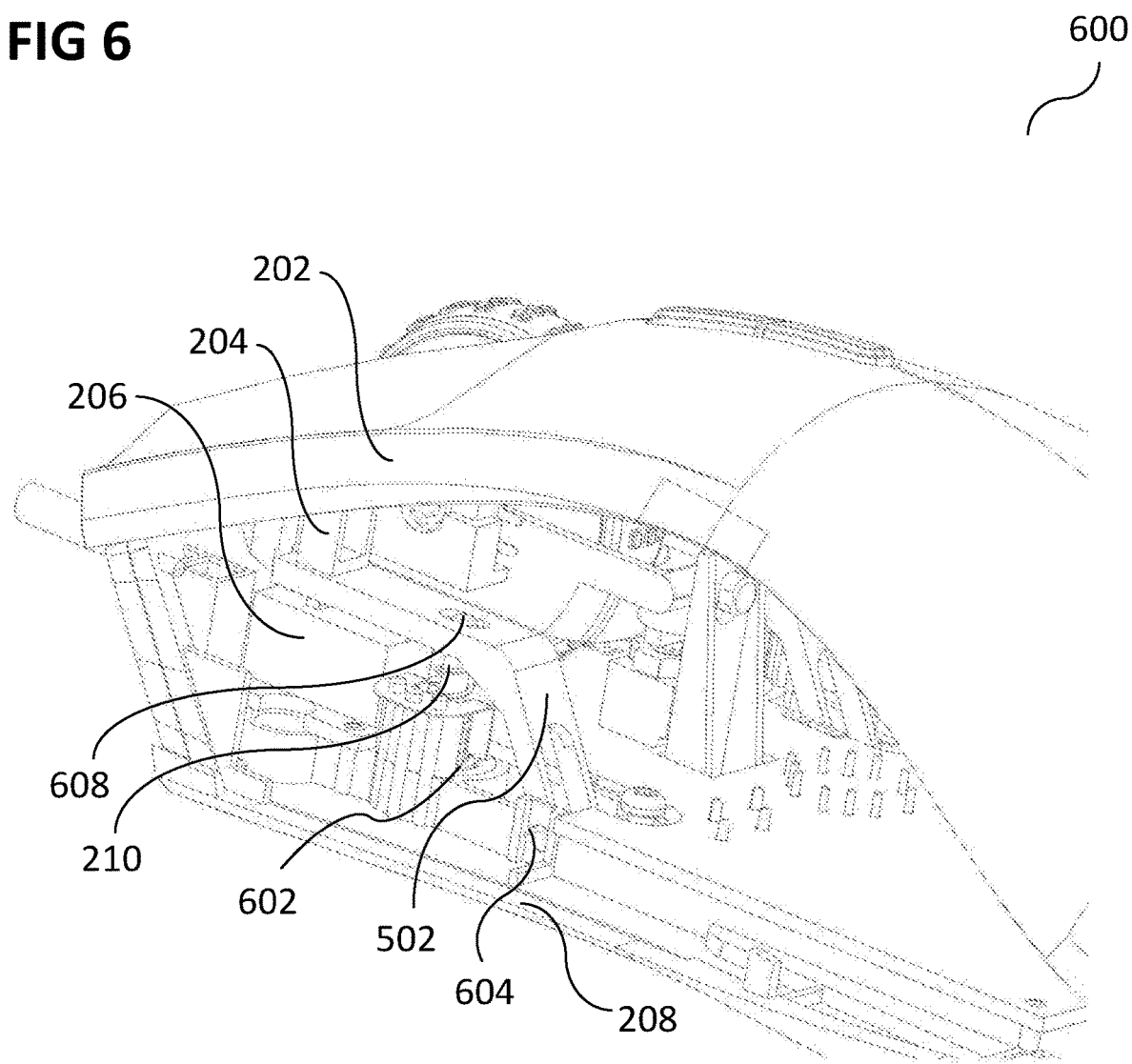

FIG. 6 shows an input device 600 according to various embodiments. Various portions of the input device 600 may be identical or similar to portions of the input device 200 of FIG. 2 and the input device 500 of FIG. 5, so that the same reference signs may be used, and that duplicate description may be omitted.

In the input device 600, similar to the input device 500 of FIG. 5, instead of the biasing element 210 (for example spring) being attached to the upper casing (in other words an upper portion 202 of the housing) of the input device (for example mouse), the biasing element 210 (for example spring) may be attached to another component (for example the lever arm, for example the cantilever 502 like shown in FIG. 5 (which may also be referred to as a key arm lever); in other words: lever member) that is in turn affixed to the plunger 204 of the mouse button (in other words: key top provided in the upper portion 202 of the housing of the input device 600). The lever element 502 may rotate around a joint 604 when the key top is pressed. A threaded insert 602 may receive the screw 212 (for example an M (metric) screw, following the metric system of measurement, or for example a screw which follows the Imperial standard, for example inches). The biasing element 210 (for example spring) may be coupled to the lever element 502 via a pin 308.

Figure 7:
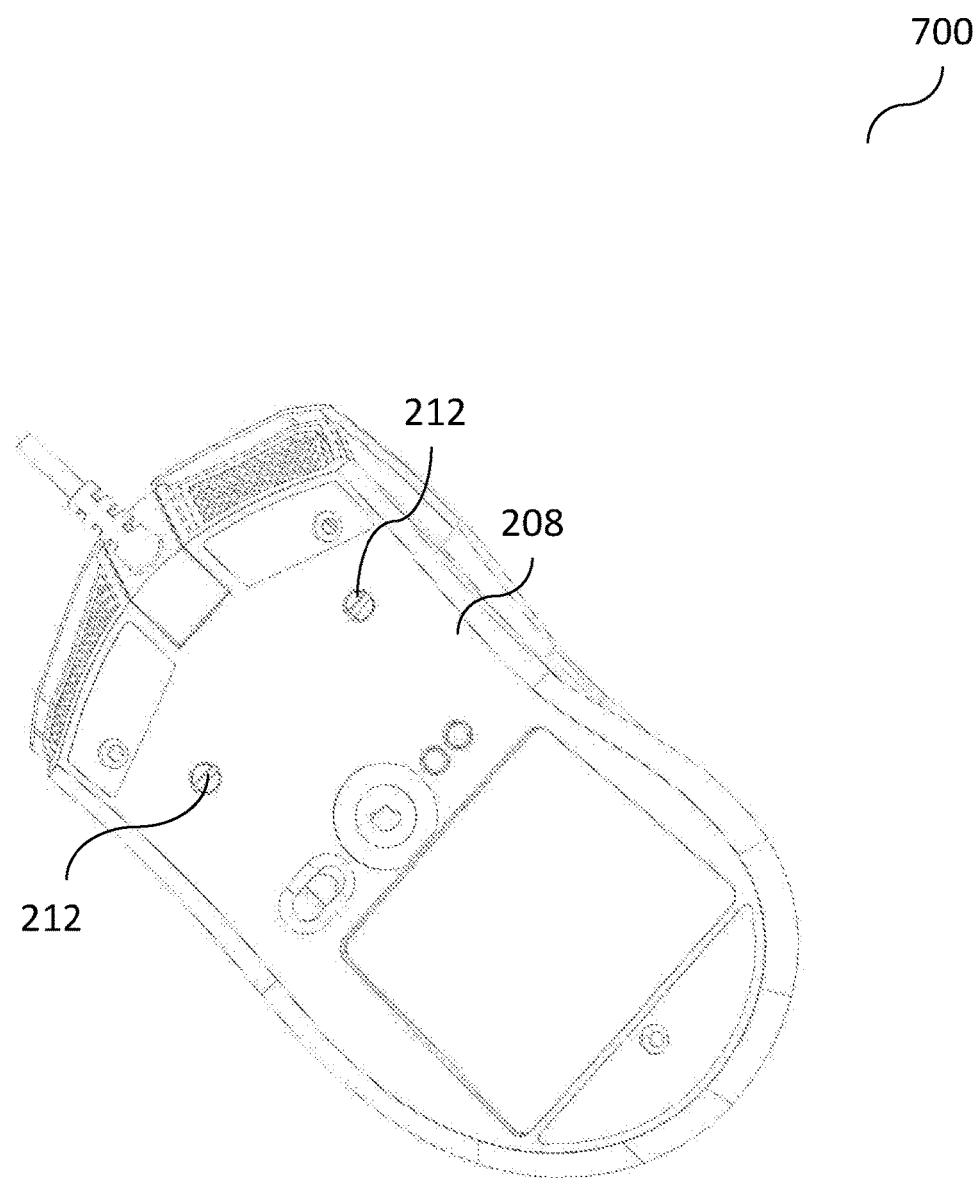
FIG. 7 shows a bottom view of the input device shown in FIG. 6.

FIG. 7 shows a bottom view 700 of the input device shown in FIG. 6. Like illustrated in FIG. 7, there may be provided a screw 212 for each of two keys of the input device. However, it will be understood that any number of keys may be provided in an input device according to various embodiments, and that each of these keys or only a subset of these keys may be provided with the biasing element and screw according to various embodiments.

Figure 8:
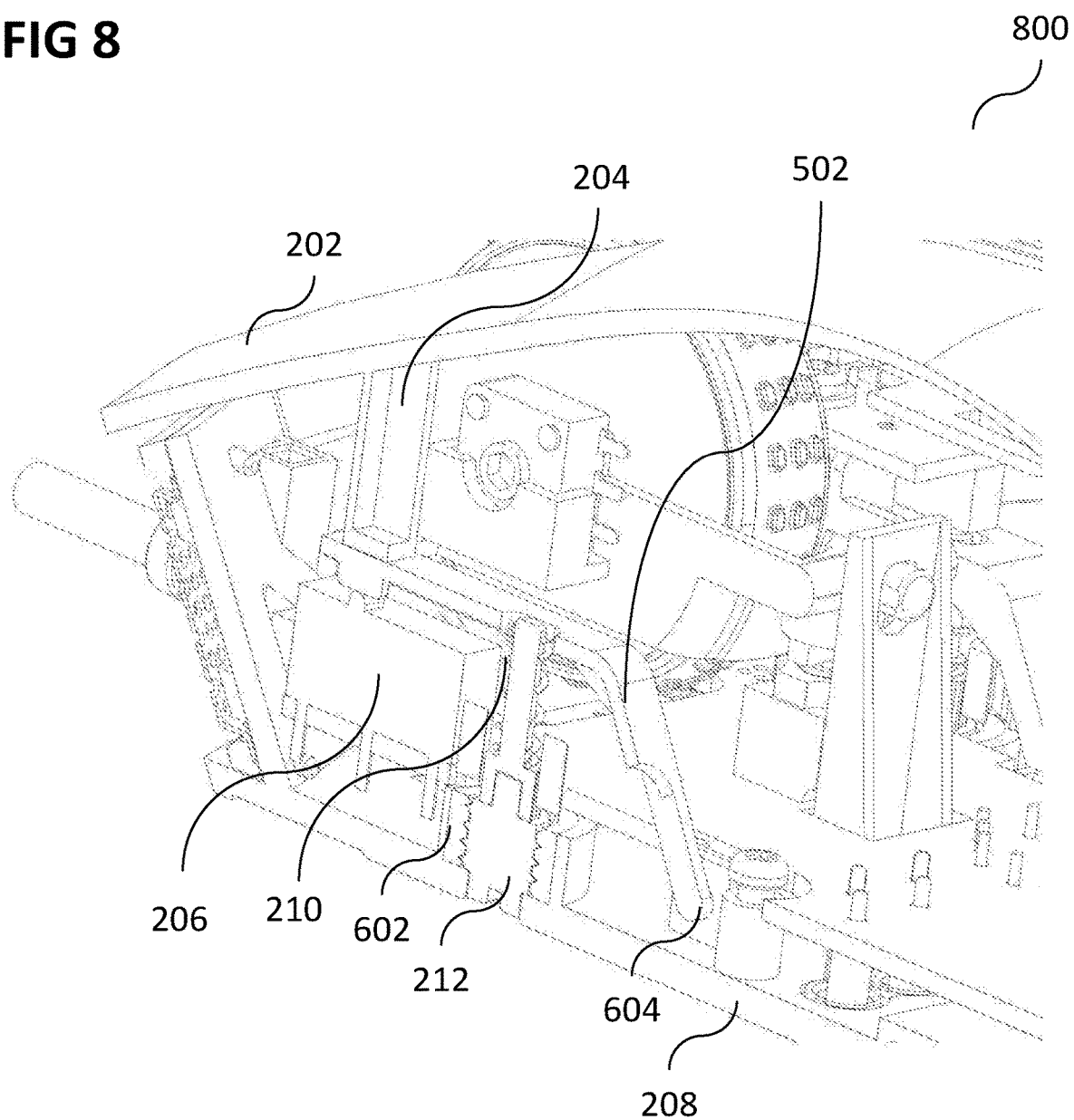
FIG. 8 shows a perspective view of the input device shown in FIG. 6.

FIG. 8 shows a perspective view 800 of the input device shown in FIG. 6.

Figure 9:
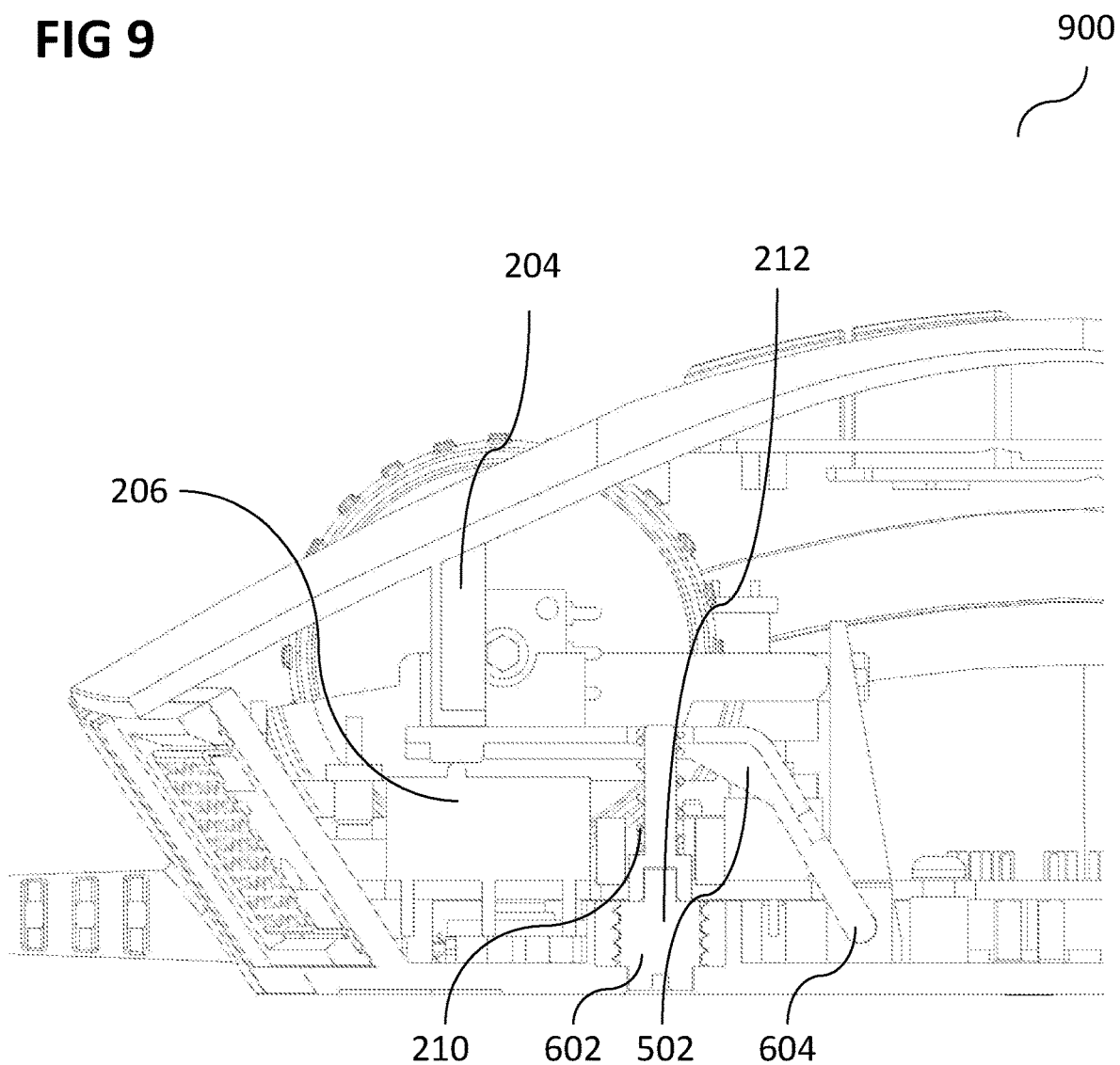
FIG. 9 shows a side view of the input device shown in FIG. 6.

FIG. 9 shows a side view 900 of the input device shown in FIG. 6.

Figure 10:
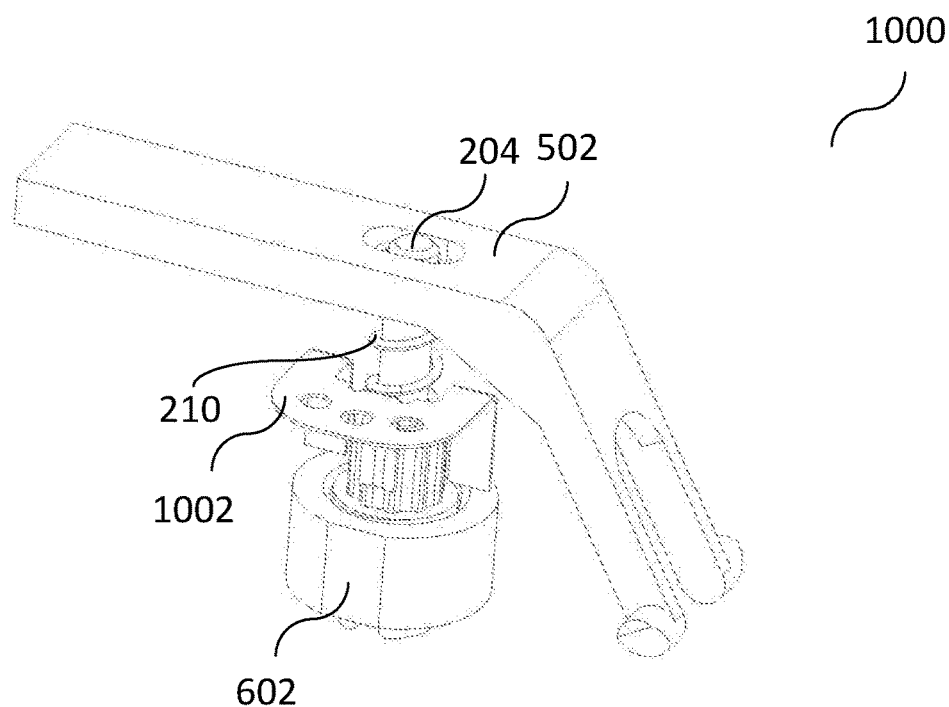
FIG. 10 shows a perspective view of a lever and key mechanism provided in the input device shown in FIG. 6.

FIG. 10 shows a perspective view 1000 of a lever and key mechanism provided in the input device shown in FIG. 6. A detent spring 1002 may be provided.

Figure 11:
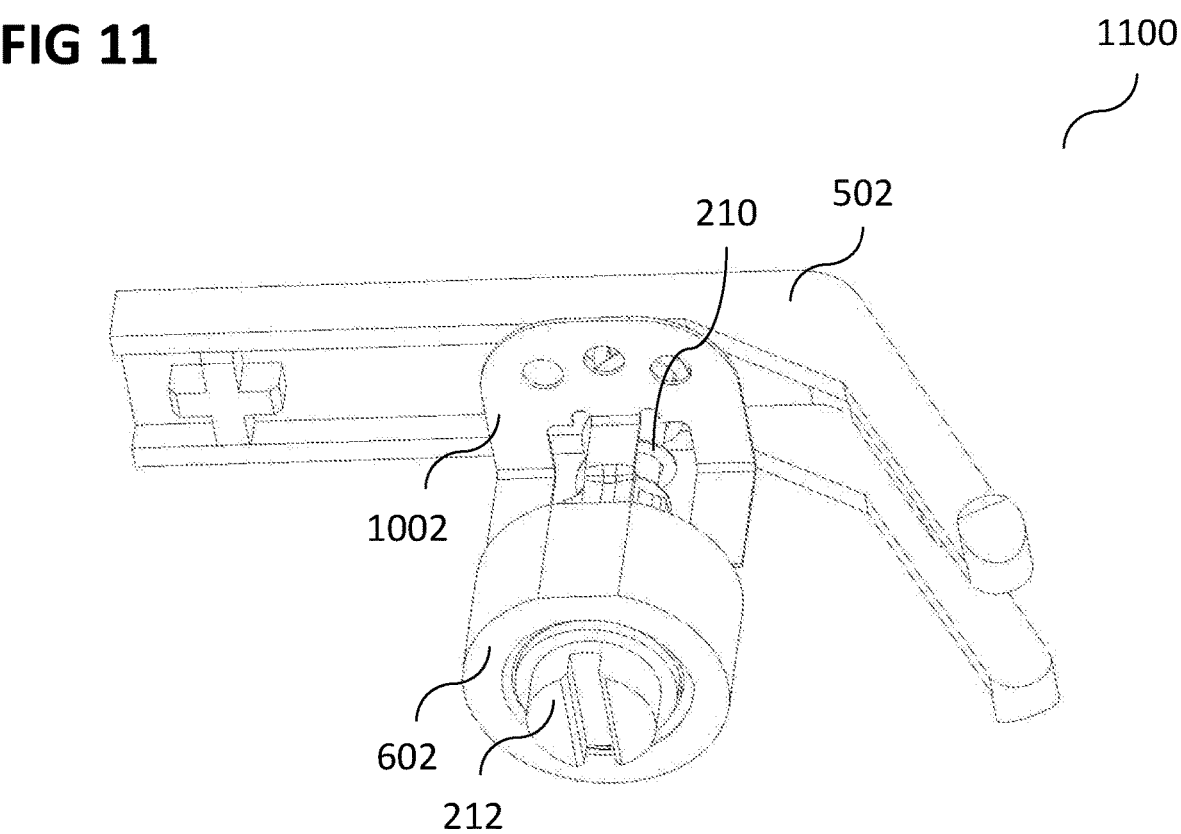
FIG. 11 shows a further perspective view of the lever and key mechanism shown in FIG. 10.

FIG. 11 shows a further perspective view 1100 of the lever and key mechanism shown in FIG. 10.

Figure 12:
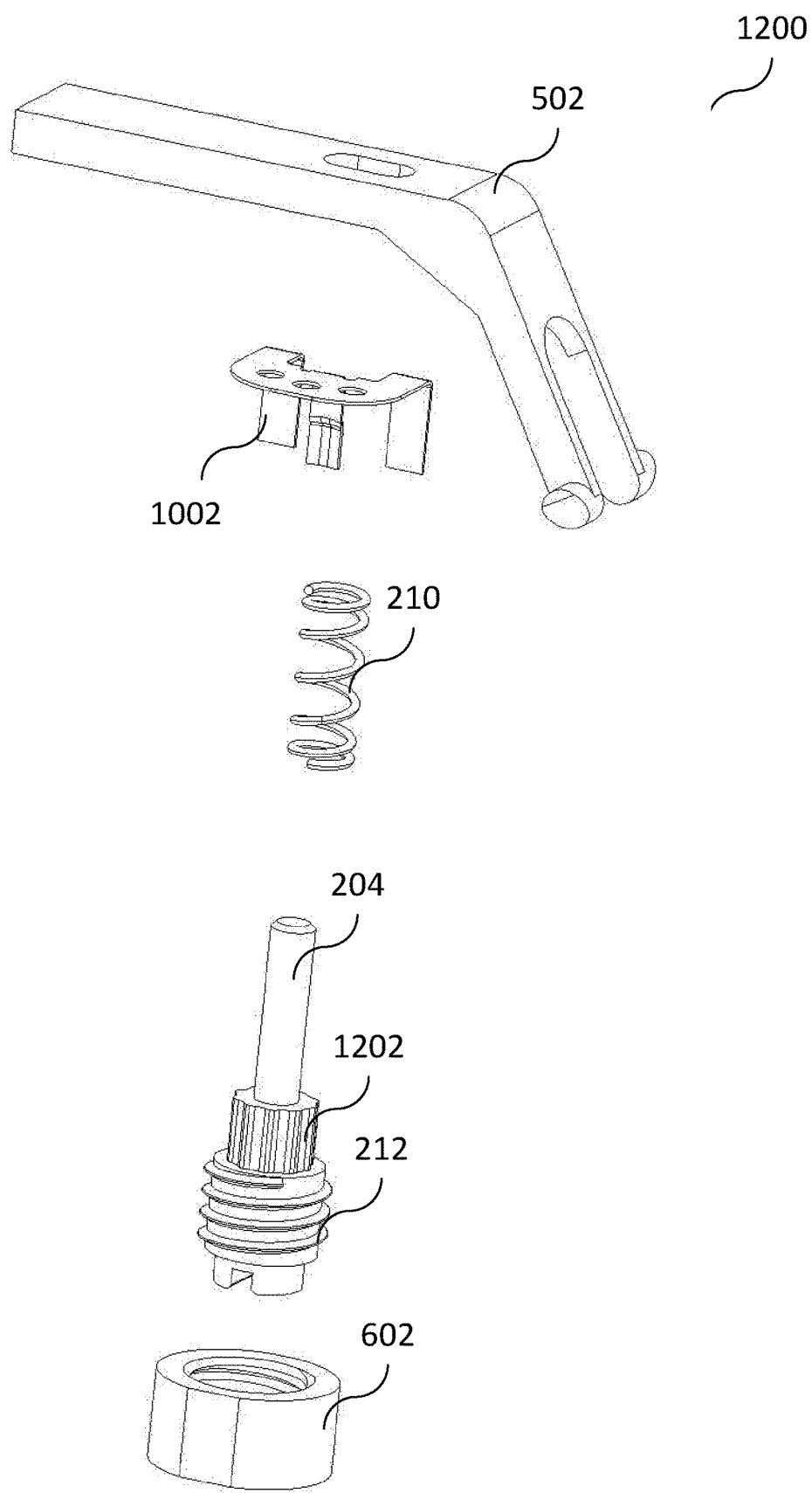
FIG. 12 shows an exploded view of the lever and key mechanism shown in FIG. 10.

FIG. 12 shows an exploded view 1200 of the lever and key mechanism shown in FIG. 10. The detents 1202 of the screw 212 are shown.

According to various embodiments, the biasing element 210 (for example spring) may provide an adjustable force by turning the screw 212.

Detents 1202 may be in built to provide a click from the detent spring 1102.

Figure 13A:
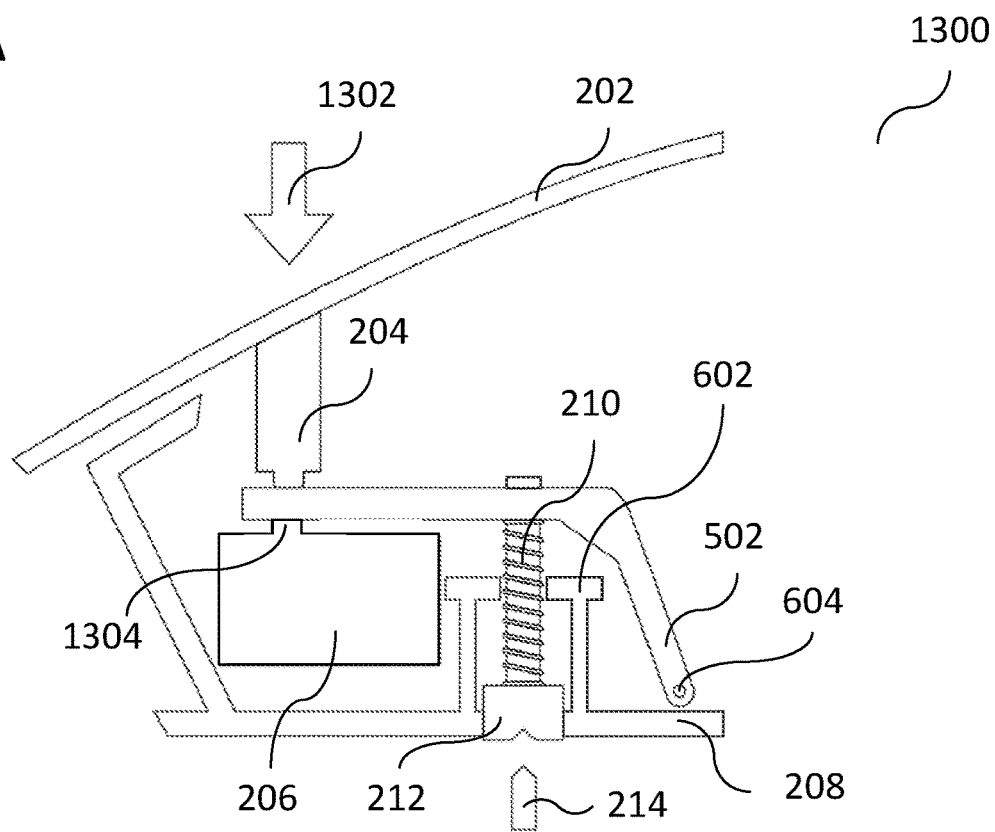
FIG. 13A, FIG. 13B, FIG. 14A, and FIG. 14B show side views of input devices according to various embodiments.

FIG. 13A shows a side view of an input device 1300 according to various embodiments. Various portions of the input device 1300 may be identical or similar to portions of the input device 200 of FIG. 2, of the input device 500 of FIG. 5, or of the input device 600 of FIG. 6 so that the same reference signs may be used, and that duplicate description may be omitted.

In the input device 1300 illustrated in FIG. 13A, the contact portion 1304 of the switch 206 (in other words: the depressible portion 1304 of the switch 206) is provided (at least substantially) at the same distance from the joint 604 with respect to the lever element 502 (which may also be referred to as a cantilever or a lever arm) as the plunger 204. As such, when the user presses the top portion 202 (for example corresponding to a button of the input device 1300) like indicated by arrow 1302, the force required to depress the depressible portion 1304 (which may be referred to as switch force) provides a direct contribution (in other words: a contribution with a factor of (at least substantially) equal to 1) to the force required to depress the top portion 202. In other words, due to the (at least substantially) same distance to the joint 202 of the plunger 204 and the depressible portion 1304, the minimum force required by a user pressing the top portion 202 like indicated by arrow 1302 to depress the depressible portion 1304 (assuming that there is no pretension by the spring 210) is equal to the switch force.

Figure 13B:
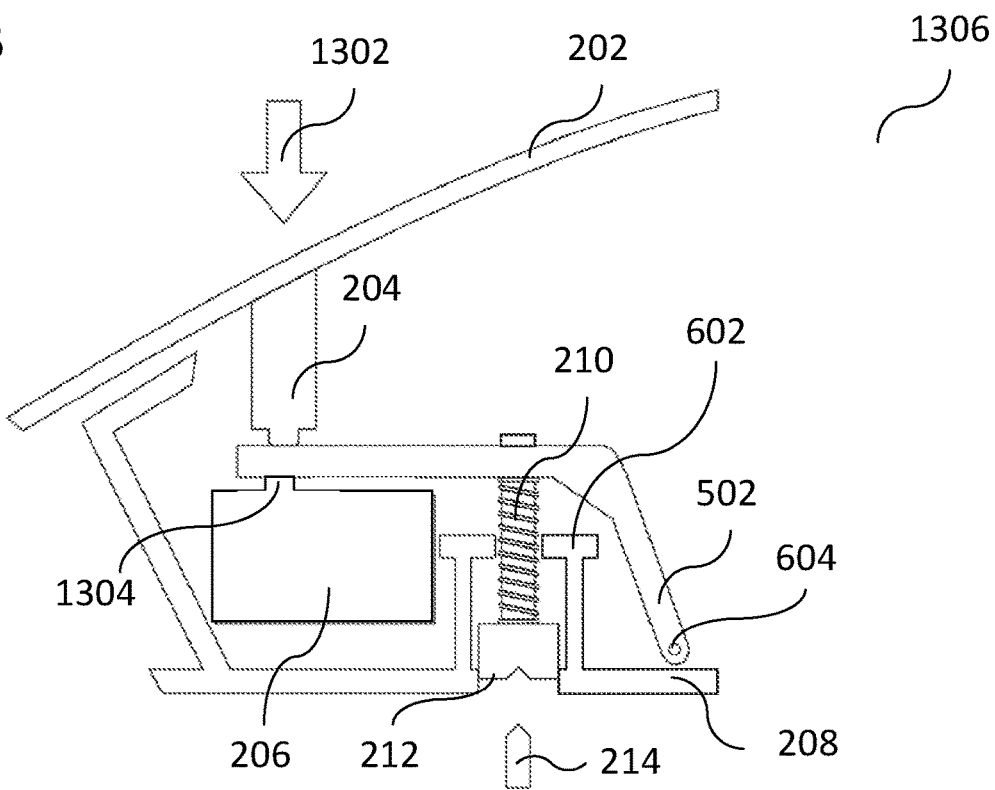

FIG. 13B shows a side view of an input device 1306 according to various embodiments. Various portions of the input device 1306 may be identical or similar to portions of the input device 200 of FIG. 2, of the input device 500 of FIG. 5, of the input device 600 of FIG. 6, or of the input device 1300 of FIG. 13A so that the same reference signs may be used, and that duplicate description may be omitted. In the input device 1306, the screw 212 is moved in further compared to the input device 1300 of FIG. 13A. As such, the pretension provided by the spring 210 is higher in the input device 1306 compared to the input device 1300 of FIG. 13A. It will be understood that although the above description makes reference to the input device 1300 of FIG. 13A and the input device 1306 of FIG. 13B, the input device 1300 and the input device 1306 may be one and the same input device, wherein only the position of the screw 212 is changed (for example using the screw driver 214).

Figure 14A:
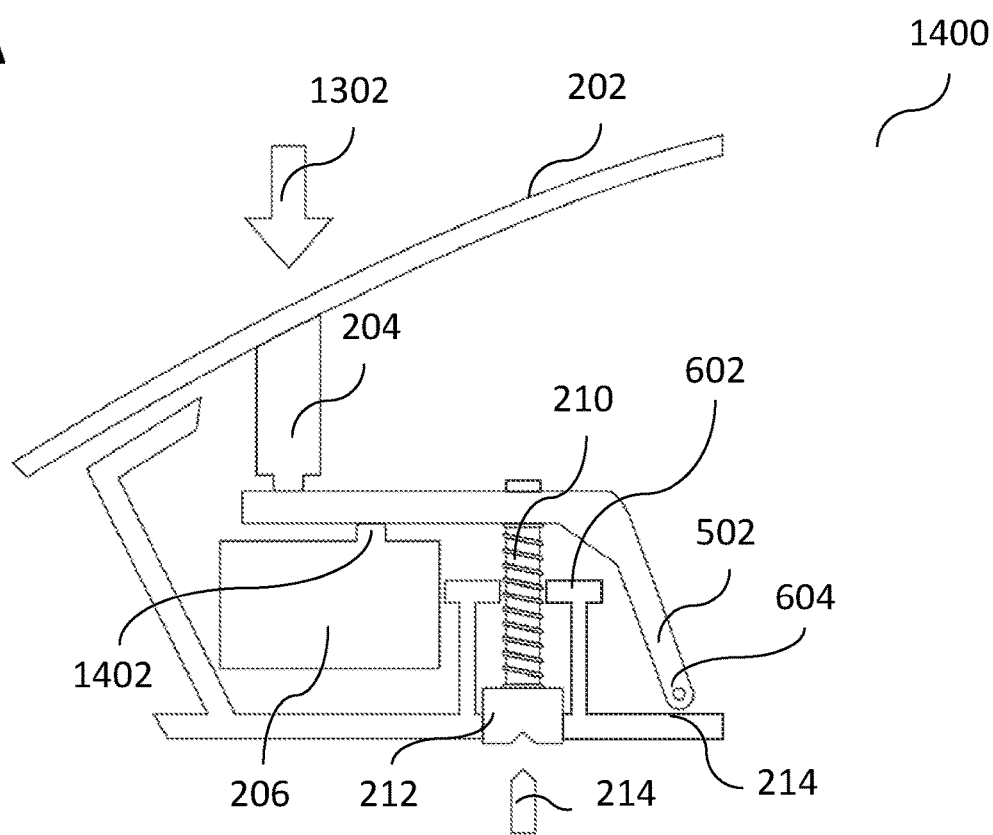

FIG. 14A shows a side view of an input device 1400 according to various embodiments. Various portions of the input device 1306 may be identical or similar to portions of the input device 200 of FIG. 2, of the input device 500 of FIG. 5, of the input device 600 of FIG. 6, or of the input device 1300 of FIG. 13A so that the same reference signs may be used, and that duplicate description may be omitted.

In the input device 1400 illustrated in FIG. 14A, the contact portion 1402 of the switch 206 (in other words: the depressible portion 1402 of the switch 206) is provided closer the joint 604 with respect to the lever element 502 than the plunger 204. As such, when the user presses the top portion 202 (for example corresponding to a button of the input device 1300) like indicated by arrow 1302, the force required to depress the depressible portion 1402 (which may be referred to as switch force) provides a contribution with a factor of less than 1 to the force required to depress the top portion 202. In other words, due to the different distance to the joint 202 of the plunger 204 and the depressible portion 1402, the minimum force required by a user pressing the top portion 202 like indicated by arrow 1302 to depress the depressible portion 1304 (assuming that there is no pretension by the spring 210) may be lower than the switch force.

Figure 14B:
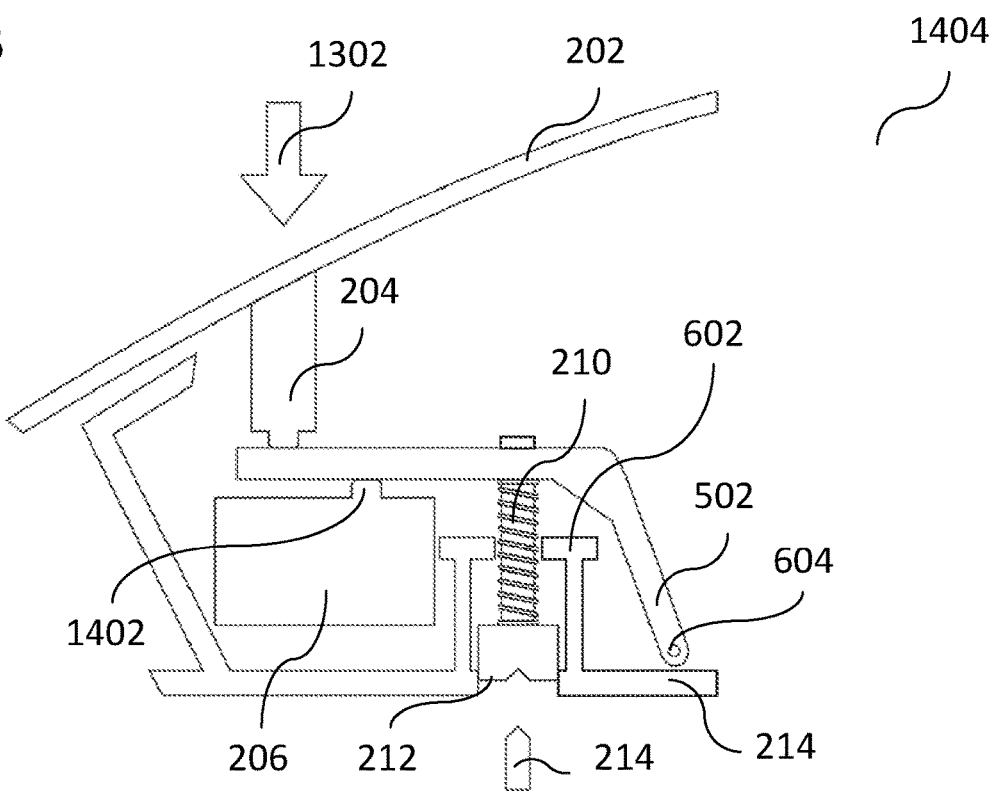

FIG. 14B shows a side view of an input device 1404 according to various embodiments. Various portions of the input device 1306 may be identical or similar to portions of the input device 200 of FIG. 2, of the input device 500 of FIG. 5, of the input device 600 of FIG. 6, of the input device 1300 of FIG. 13A, or of the input device 1400 of FIG. 14A, so that the same reference signs may be used, and that duplicate description may be omitted. In the input device 1404, the screw 212 is moved in further compared to the input device 1400 of FIG. 14A. As such, the pretension provided by the spring 210 is higher in the input device 1404 compared to the input device 1400 of FIG. 14A. It will be understood that although the above description makes reference to the input device 1400 of FIG. 14A and the input device 1404 of FIG. 14B, the input device 1400 and the input device 1404 may be one and the same input device, wherein only the position of the screw 212 is changed (for example using the screw driver 214).

Figure 15A:
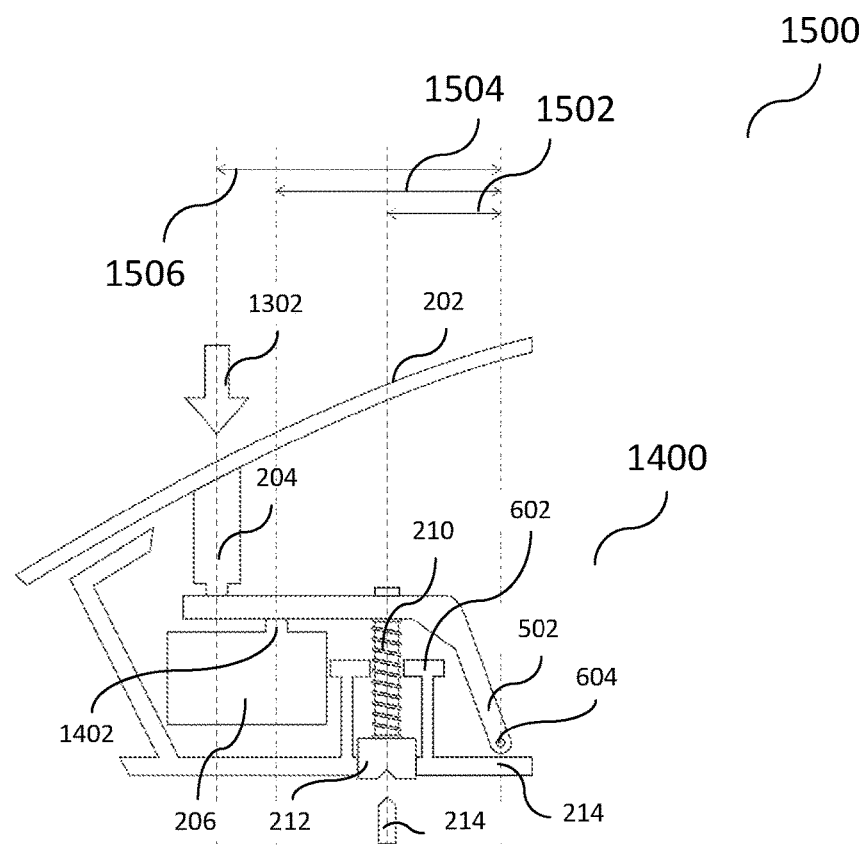
FIG. 15A and FIG. 15B show diagrams illustrating the various distances in an input device according to various embodiments.

FIG. 15A shows a diagram 1500 illustrating the various distances in an input device according to various embodiments. Various portions of the input device 1306 may be identical or similar to portions of the input device 200 of FIG. 2, of the input device 500 of FIG. 5, of the input device 600 of FIG. 6, of the input device 1300 of FIG. 13A, or of the input device 1400 of FIG. 14A, so that the same reference signs may be used, and that duplicate description may be omitted.

Let $F_x$ be the force at the spring 210, for example at a distance x from the pivot of joint 604, like indicated by 1502. Let $F_y$ be the force at the depressible portion 1402 of the switch 206, for example at a distance y from the pivot of joint 604, like indicated by 1504. Let $F_z$ be the force at a finger of a user of the input device 1400 (on the upper portion 202), which for example may coincide with the position of the plunger 204, for example at a distance z from the pivot of joint 604, like indicated by 1506. Then the following equation holds:

$$F_z z = F_y y + F_x x,$$

and thus $$F_z = \frac{(F_y y + F_x x)}{z} = \frac{y}{z} F_y + \frac{x}{z} F_x.$$

As can be seen from this equation, if, like in the input device 1400 shown in FIG. 14A, the depressible portion 1402 of the switch 206 is closer to the joint 604 than the plunger 204, the contribution of $F_y$ to $F_z$ is weighted by a factor of less than 1, as in this case y is smaller than z, and thus $$\frac{y}{z}$$

is smaller than 1. In the input device 1400 shown in FIG. 14A, by separating Y and Z, i.e., by having an actuating location which is not in line with the switch, the actuating force may be below the switch force. Thus, the lowest possible actuation force may be lower than the operating force of the switch. This is because the 2 lines of action (as above) are separated.

If, however, like in the input device 1300 shown in FIG. 13A, the depressible portion 1304 of the switch 206 is basically at the same position with respect to that joint 604 as the plunger 204, the contribution of $F_y$ to $F_z$ is weighted by a factor of (at least substantially) equal to 1, as in this case, y is (at least substantially) equal to z, and thus $$\frac{y}{z}$$

is (at least substantially) equal to 1. In the input device 1300 shown in FIGS. 13A, Y and Z are in line (with each other), i.e., the actuation location is in line with the switch. Hence the lowest actuation force is the switch force, and it cannot be lower than the switch force. In other words, the lowest possible actuation force is the operating force of the switch. As described above, this is because the line of actuation is the same as the switch line of actuation.

Figure 15B:
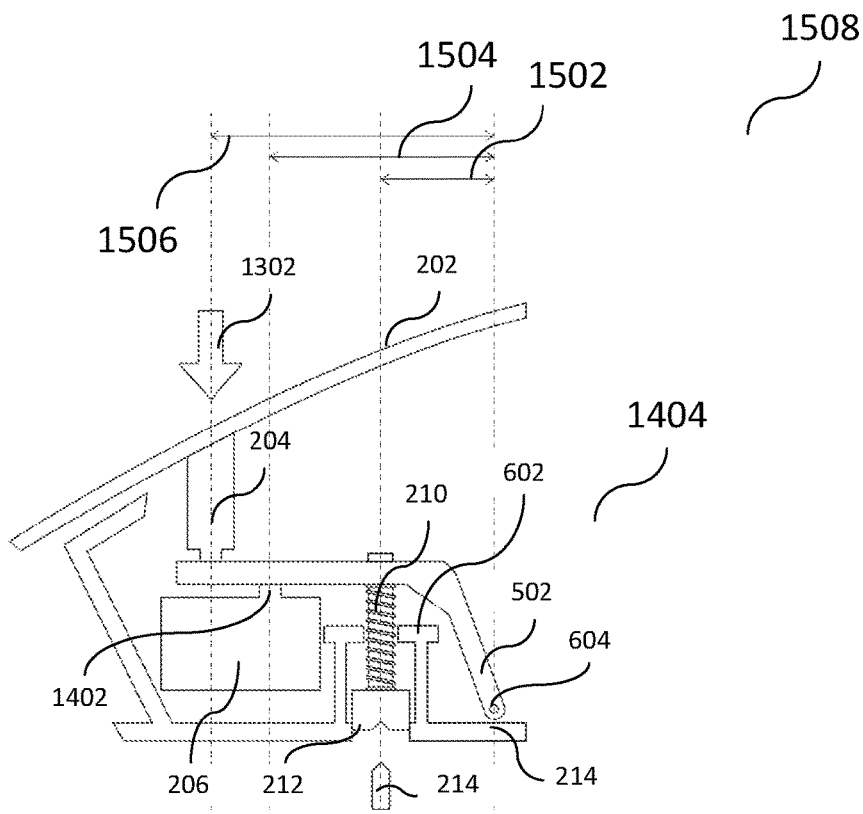

FIG. 15B shows a diagram 1508 illustrating the various distances in an input device according to various embodiments. Various portions of the input device 1306 may be identical or similar to portions of the input device 200 of FIG. 2, of the input device 500 of FIG. 5, of the input device 600 of FIG. 6, of the input device 1300 of FIG. 13A, of the input device 1400 of FIG. 14A, of the input device 1404 of FIG. 14B, or of the input device 1500 of FIG. 15A, so that the same reference signs may be used, and that duplicate description may be omitted.

According to various embodiments, with a switch force corresponding to a mass of 60 g (for example a force of about 0.6 N), in the input device 1300 shown in FIG. 13A, the click force may be adjusted in a range corresponding to a mass between 60 g and 110 g, while in the input device 1400 shown in FIG. 14A, the click force may be adjusted in a range corresponding to a mass between 50 g and 110 g.

According to various embodiments, devices may be provided, by which the following problems may be solved:

1. Some gamers may click their mouse buttons by mistake because of low click force which could have undesirable consequences in game.

2. Different games may have different click requirements. For example, in MOBA and RTS games, being able to click with a high frequency is a desirable function in a mouse, while in FPS (first person shooter) games, users may prefer mice that enable them to click with the least possible latency.

3. Once users buy a conventional mouse, they may not be able to alter the tactile feel of the click in any way. Since different mice may use different suppliers for their microswitches, the mice may differ in terms of tactile feel and click force. Since it is a matter of personal preference, there is no "one size fits all" solution to this problem.

Various embodiments may enable users to customize the click force to prevent accidental clicking.

Various embodiments may enable users to change (in other words: tweak) the click force and tactile feel to their preferences to get high click frequency or low latency, ensuring their settings can match the game they are playing.

Various embodiments may enable users to change the tactile feel of the click to suit their preferences.

Various embodiments may be used in a gaming mouse which may be provided as a mouse that is ideal for any kind of game based on its click customization capabilities.

According to various embodiments, the biasing element may include or may be a spring, for example a torsion spring, a leaf spring, a spring plate, or a linear spring.

According to various embodiments, there are various options for the position of the spring and what it is being connected to, for example, the spring connected to the top cover and the micro-switch instead of bottom of the mouse to the plunger/actuator.

According to various embodiments, a mechanism (or position of) by which the biasing element (for example spring) is tensed may be provided, for example, i.e., through a sliding mechanism placed at the bottom, or through a screw mechanism accessible from the top of the mouse rather than the bottom.

The following examples pertain to further embodiments.

Example 1 is an input device comprising: a housing comprising an upper portion and a lower portion; a key top provided at the upper portion; a switch coupled to the key top; a biasing element comprising a first end and a second end, wherein the first end is coupled to the key top, and wherein the second end is coupled to the lower portion; and an adjustment mechanism configured to adjust a pretension of the biasing element.

In example 2, the subject-matter of example 1 can optionally include that the biasing element comprises a spring.

In example 3, the subject-matter of example 2 can optionally include that the spring comprises at least one of a linear spring, a torsion spring, a leaf spring, or a spring plate.

In example 4, the subject-matter of any one of examples 1 to 3 can optionally include that the key top comprises a plunger.

In example 5, the subject-matter of example 4 can optionally include that the plunger is configured to depress the switch.

In example 6, the subject-matter of any one of examples 1 to 5 can optionally include that the switch comprises a mechanical switch.

In example 7, the subject-matter of example 6 can optionally include that the mechanical switch comprises a micro switch.

In example 8, the subject-matter of any one of examples 1 to 7 can optionally include that the switch comprises a rubber dome.

In example 9, the subject-matter of any one of examples 1 to 8 can optionally include that the second end is directly coupled to the lower portion.

In example 10, the subject-matter of any one of examples 1 to 9 can optionally include that the second end is surrounded by a threaded insert.

In example 11, the subject-matter of any one of examples 1 to 10 can optionally include that the second end is coupled to the lower portion via a lever member.

In example 12, the subject-matter of example 11 can optionally include that the lever member is coupled to the key top so that when the key top is depressed, the biasing element is depressed.

In example 13, the subject-matter of any one of examples 11 to 12 can optionally include that the lever member comprises a joint.

In example 14, the subject-matter of any one of examples 1 to 13 can optionally include that the second end is coupled to the lower portion via the switch.

In example 15, the subject-matter of any one of examples 1 to 14 can optionally include that the adjustment mechanism is accessible via the lower portion.

In example 16, the subject-matter of any one of examples 1 to 15 can optionally include that the adjustment mechanism comprises a screw.

In example 17, the subject-matter of example 16 can optionally include that the second end is surrounded by a threaded insert configured to engage with the screw.

In example 18, the subject-matter of any one of examples 16 to 17 can optionally include that the lower portion comprises a hole configured to expose the screw.

In example 19, the subject-matter of any one of examples 1 to 18 can optionally include that the adjustment mechanism comprises a dial.

In example 20, the subject-matter of any one of examples 1 to 19 can optionally include that the adjustment mechanism comprises a sliding element.

In example 21, the subject-matter of example 20 can optionally include that the sliding element is configured to be slided in a direction at least substantially perpendicular to a direction between the first end and the second end.

In example 22, the subject-matter of any one of examples 1 to 21 can optionally include that the input device comprises at least one of a computer mouse, a joystick, a gamepad, or a keyboard.

In example 23, the subject-matter of any one of examples 1 to 22 can optionally include that the upper portion comprises a further key top coupled to a further switch and to a further biasing element, and that the adjustment mechanism is further configured to adjust a pretension of the further biasing element.

In example 24, the subject-matter of any one of examples 1 to 23 can optionally include: a lever member; and a plunger; wherein the switch comprises a depressible portion; and wherein the depressible portion is coupleable to the key top via the lever member and the plunger.

In example 25, the subject-matter of example 24 can optionally include that the lever member is coupled to the lower portion via a joint.

In example 26, the subject-matter of example 25 can optionally include that the plunger is coupleable to the lever member at a distance from the joint which is at least substantially equal to a distance from the joint at which the depressible portion is coupleable to the lever member.

In example 27, the subject-matter of any one of examples 25 to 26 can optionally include that the plunger is coupleable to the lever member at a distance from the joint which is larger than a distance from the joint at which the depressible portion is coupleable to the lever member.

In example 28, the subject-matter of any one of examples 25 to 27 can optionally include that the plunger is coupleable to the lever member at a distance from the joint which is smaller than a distance from the joint at which the depressible portion is coupleable to the lever member.

The following examples pertain to yet further embodiments.

Example E1 is an input device comprising: a housing comprising an upper portion and a lower portion; a key top provided at the upper portion; a lever member coupled to the lower portion via a joint; a plunger; and a switch comprising a depressible portion coupleable to the key top via the lever member and the plunger; wherein the plunger is coupleable to the lever member at a distance from the joint which is different from a distance from the joint at which the depressible portion is coupleable to the lever member.

In example E2, the subject-matter of example E1 can optionally include that the plunger is coupleable to the lever member at a distance from the joint which is larger than a distance from the joint at which the depressible portion is coupleable to the lever member.

In example E3, the subject-matter of any one of examples E1 to E2 can optionally include that the plunger is coupleable to the lever member at a distance from the joint which is smaller than a distance from the joint at which the depressible portion is coupleable to the lever member.

In example E4, the subject-matter of any one of examples E1 to E3 can optionally include: a biasing element comprising a first end and a second end, wherein the first end is coupled to the key top, and wherein the second end is coupled to the lower portion; and an adjustment mechanism configured to adjust a pretension of the biasing element.

In example E5, the subject-matter of example E4 can optionally include that the biasing element comprises a spring.

In example E6, the subject-matter of example E5 can optionally include that the spring comprises at least one of a linear spring, a torsion spring, a leaf spring, or a spring plate.

In example E7, the subject-matter of any one of examples E1 to E6 can optionally include that the key top comprises the plunger.

In example E8, the subject-matter of example E7 can optionally include that the plunger is configured to depress the switch.

In example E9, the subject-matter of any one of examples E1 to E8 can optionally include that the switch comprises a mechanical switch.

In example E10, the subject-matter of any one of examples E1 to E9 can optionally include that the mechanical switch comprises a micro switch.

In example E11, the subject-matter of any one of examples E1 to E10 can optionally include that the switch comprises a rubber dome.

In example E12, the subject-matter of any one of examples E4, E5, or E6 can optionally include that the second end is directly coupled to the lower portion.

In example E13, the subject-matter of any one of examples E4, E5, E6, or E12 can optionally include that the second end is surrounded by a threaded insert.

In example E14, the subject-matter of any one of examples E4, E5, E6, E12, or E13 can optionally include that the second end is coupled to the lower portion via the lever member.

In example E15, the subject-matter of example E14 can optionally include that the lever member is coupled to the key top so that when the key top is depressed, the biasing element is depressed.

In example E16, the subject-matter of any one of examples E14 to E15 can optionally include that the lever member comprises the joint.

In example E17, the subject-matter of any one of examples E4 to E6 or E12 to E16 can optionally include that the second end is coupled to the lower portion via the switch.

In example E18, the subject-matter of any one of examples E4 to E6 or E12 to E17 can optionally include that the adjustment mechanism is accessible via the lower portion.

In example E19, the subject-matter of any one of examples E4 to E6 or E12 to E18 can optionally include that the adjustment mechanism comprises a screw.

In example E20, the subject-matter of example E19 can optionally include that the second end is surrounded by a threaded insert configured to engage with the screw.

In example E21, the subject-matter of any one of examples E19 to E20 can optionally include that the lower portion comprises a hole configured to expose the screw.

In example E22, the subject-matter of any one of examples E4 to E6 or E12 to E21 can optionally include that the adjustment mechanism comprises a dial.

In example E23, the subject-matter of any one of examples E4 to E6 or E12 to E22 can optionally include that the adjustment mechanism comprises a sliding element.

In example E24, the subject-matter of example E23 can optionally include that the sliding element is configured to be slided in a direction at least substantially perpendicular to a direction between the first end and the second end.

In example E25, the subject-matter of any one of examples E1 to E24 can optionally include that the input device comprises at least one of a computer mouse, a joystick, a gamepad, or a keyboard.

In example E26, the subject-matter of any one of examples E4 to E6 or E12 to E24 can optionally include that the upper portion comprises a further key top coupled to a further switch and to a further biasing element; and wherein the adjustment mechanism is further configured to adjust a pretension of the further biasing element.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An input device comprising:
a housing comprising an upper portion and a lower portion;
a key top provided at the upper portion;
a lever member coupled to the lower portion via a joint;
a plunger;
a switch comprising a depressible portion, the depressible portion being actuated via the lever member and the plunger when the key top is pressed,
wherein, when the plunger is depressed, a first distance between the joint and a first point at which the plunger is in contact with the lever member is different from a second distance between the joint and a second point at which the depressible portion is in contact with the lever member;
a biasing element comprising a first end and a second end, wherein the first end is coupled to the lever member, and wherein the second end is coupled to the lower portion such that the biasing element biases the lever member against pivoting about the joint; and
an adjustment mechanism configured to adjust a pretension of the biasing element.

2. The input device of claim 1,
wherein the first distance is larger than the second distance.
3. The input device of claim 1,
wherein the biasing element comprises a spring.
4. The input device of claim 1,
wherein the key top is connected to the plunger.
5. The input device of claim 1,
wherein the switch comprises one of a mechanical switch or a rubber dome.
6. The input device of claim 1,
wherein the second end is directly coupled to the lower portion.
7. The input device of claim 1,
wherein the second end is surrounded by a threaded insert.
8. The input device of claim 1,
wherein the lever member is coupled to the key top so that when the key top is depressed, the biasing element is depressed.
9. The input device of claim 1,
wherein the lever member comprises the joint.
10. The input device of claim 1,
wherein the adjustment mechanism is accessible via the lower portion.
11. The input device of claim 1,
wherein the adjustment mechanism comprises at least one of a screw or a sliding element.
12. The input device of claim 11,
wherein the second end is surrounded by a threaded insert configured to engage with the screw.
13. The input device of claim 11,
wherein the lower portion comprises a hole configured to expose the screw.
14. The input device of claim 11,
wherein the sliding element is configured to be slided in a direction at least perpendicular to a direction between the first end and the second end.
15. The input device of claim 1,
wherein the input device comprises at least one of a computer mouse, a joystick, a gamepad, or a keyboard.
16. The input device of claim 1,
wherein the upper portion comprises a further key top coupled to a further switch and to a further biasing element; and
wherein the adjustment mechanism is further configured to adjust a pretension of the further biasing element.

* * * * *